US012579936B2

(12) United States Patent
Shimoda et al.

(10) Patent No.: US 12,579,936 B2
(45) Date of Patent: *Mar. 17, 2026

(54) DISPLAY DEVICE

(71) Applicant: Wuhan Tianma Micro-Electronics Co., Ltd., Wuhan (CN)

(72) Inventors: Masamichi Shimoda, Kawasaki (JP); Genshiro Kawachi, Kawasaki (JP)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,710

(22) Filed: Aug. 30, 2024

(65) Prior Publication Data

US 2024/0428736 A1 Dec. 26, 2024

Related U.S. Application Data

(63) Continuation of application No. 17/959,933, filed on Oct. 4, 2022, now Pat. No. 12,106,712.

(30) Foreign Application Priority Data

Oct. 5, 2021 (JP) ................................ 2021-164085
Jun. 27, 2022 (JP) ................................ 2022-102766

(51) Int. Cl.
*G09G 3/3233* (2016.01)

(52) U.S. Cl.
CPC ... *G09G 3/3233* (2013.01); *G09G 2300/0413* (2013.01); *G09G 2300/0842* (2013.01);
(Continued)

(58) Field of Classification Search
None
See application file for complete search history.

(56) References Cited

U.S. PATENT DOCUMENTS 6,333,728 B1 12/2001 Libsch
7,538,306 B2 5/2009 Hente
(Continued)

FOREIGN PATENT DOCUMENTS

CN 101354864 A 1/2009
CN 101373578 A 2/2009
(Continued)

OTHER PUBLICATIONS

Office Action, issued in Chinese Patent Application No. 202211230133.9 dated May 29, 2024.
(Continued)

*Primary Examiner* — Dorothy Harris
(74) *Attorney, Agent, or Firm* — NIXON & VANDERHYE

(57) ABSTRACT

A display device includes a display pixel circuit including a display light-emitting element, a reference light-emitting element, and a display driving circuit. The display pixel circuit is configured to control light emission of the display light-emitting element based on a data signal in accordance with video data. The reference light-emitting element is precluded from the control in accordance with video data. The display driving circuit is configured to acquire a reference signal indicating a current-voltage characteristic of the reference light-emitting element, acquire a characteristic signal indicating the current-voltage characteristic of the display light-emitting element, and generate a signal indicating a degree of deterioration of the display light-emitting element based on a difference of the characteristic signal from the reference signal.

12 Claims, 13 Drawing Sheets

(52) U.S. Cl.
CPC ... *G09G 2310/08* (2013.01); *G09G 2320/029* (2013.01); *G09G 2320/0295* (2013.01); *G09G 2320/043* (2013.01); *G09G 2320/046* (2013.01)

(56) References Cited

U.S. PATENT DOCUMENTS

| | | | | |
|---|---|---|---|---|
| 8,274,503 | B2 | 9/2012 | Kwon | |
| 8,558,767 | B2 | 10/2013 | Kwon | |
| 8,558,825 | B2 | 10/2013 | Kim et al. | |
| 12,106,712 | B2 * | 10/2024 | Shimoda | G09G 3/3233 |
| 2003/0063081 | A1 * | 4/2003 | Kimura | G09G 3/3233 345/211 |
| 2004/0070558 | A1 * | 4/2004 | Cok | G09G 3/3225 345/76 |
| 2004/0150594 | A1 * | 8/2004 | Koyama | G09G 3/3233 345/82 |
| 2007/0146518 | A1 | 6/2007 | Hong | |
| 2008/0012804 | A1 | 1/2008 | Kim | |
| 2008/0210847 | A1 | 9/2008 | Hente | |
| 2008/0231558 | A1 | 9/2008 | Naugler | |
| 2009/0027377 | A1 | 1/2009 | Kwon | |
| 2009/0051628 | A1 | 2/2009 | Kwon | |
| 2011/0122119 | A1 | 5/2011 | Bae et al. | |
| 2011/0134101 | A1 | 6/2011 | Yamashita | |
| 2012/0299973 | A1 * | 11/2012 | Jaffari | G09G 3/006 345/690 |
| 2014/0198092 | A1 * | 7/2014 | Azizi | G09G 3/3258 345/212 |
| 2015/0379909 | A1 * | 12/2015 | Yu | G09G 3/006 345/78 |
| 2016/0027412 | A1 | 1/2016 | Igawa | |
| 2016/0104409 | A1 | 4/2016 | Jeon | |
| 2016/0133175 | A1 | 5/2016 | Lee | |
| 2016/0155380 | A1 | 6/2016 | Kwon | |
| 2016/0329016 | A1 | 11/2016 | Chaji | |
| 2017/0270855 | A1 | 9/2017 | Maeda | |
| 2018/0033366 | A1 * | 2/2018 | Yoo | G09G 3/2003 |
| 2018/0218703 | A1 * | 8/2018 | Lee | G09G 3/3648 |
| 2020/0013358 | A1 | 1/2020 | Kawachi | |
| 2020/0105195 | A1 | 4/2020 | Song | |
| 2020/0202787 | A1 * | 6/2020 | Do | G09G 3/2007 |

FOREIGN PATENT DOCUMENTS

| | | | |
|---|---|---|---|
| CN | 102074189 | A | 5/2011 |
| CN | 103562987 | A | 2/2014 |
| CN | 109147672 | A | 1/2019 |
| CN | 110969970 | A | 4/2020 |
| CN | 111179842 | A | 5/2020 |

OTHER PUBLICATIONS

Office Action, issued in Chinese Patent Application No. 202211230133.9 dated Mar. 27, 2025. (concise explanation of the relevance).

* cited by examiner

DISPLAY DEVICE

CROSS-REFERENCE TO RELATED APPLICATIONS

This application is a Continuation of application Ser. No. 17/959,933, filed on Oct. 4, 2022, which claims priority under 35 U.S.C. § 119(a) to Application Nos. 2021-164085, filed in Japan on Oct. 5, 2021 and 2022-102766, filed in Japan on Jun. 27, 2022, all of which are hereby expressly incorporated by reference into the present application.

BACKGROUND

This disclosure relates to a display device and particularly, evaluation of deterioration in brightness of a light-emitting element.

An organic light-emitting diode (OLED) element is a current-driven light-emitting element and therefore, does not need a backlight. In addition to this, the OLED element has advantages for achievement of low power consumption, wide viewing angle, and high contrast ratio; it is expected to contribute to development of flat panel display devices.

A light-emitting device such as an OLED element suffers from irreversible variation in its characteristics that affects its light-emission life. Specifically, the variation causes a problem such as an image burn-in or a residual image, where a trace of a fixed image is persistently seen. An example of a method to solve or mitigate the problem compensates for the deterioration in brightness of OLED elements. This method estimates the degree of deterioration of each OLED element and controls its light emission by adjusting the brightness depending on the degree of deterioration. As a result, differences in brightness among the pixels caused by deterioration of the OLED elements can be reduced.

SUMMARY

An aspect of this disclosure is a display device including: a display pixel circuit including a display light-emitting element; a reference light-emitting element; and a display driving circuit, wherein the display pixel circuit is configured to control light emission of the display light-emitting element based on a data signal in accordance with video data. The reference light-emitting element is precluded from the control in accordance with video data. The display driving circuit is configured to: acquire a reference signal indicating a current-voltage characteristic of the reference light-emitting element; acquire a characteristic signal indicating the current-voltage characteristic of the display light-emitting element; and generate a signal indicating a degree of deterioration of the display light-emitting element based on a difference of the characteristic signal from the reference signal.

It is to be understood that both the foregoing general description and the following detailed description are exemplary and explanatory and are not restrictive of this disclosure.

EMBODIMENTS

Figure 1:
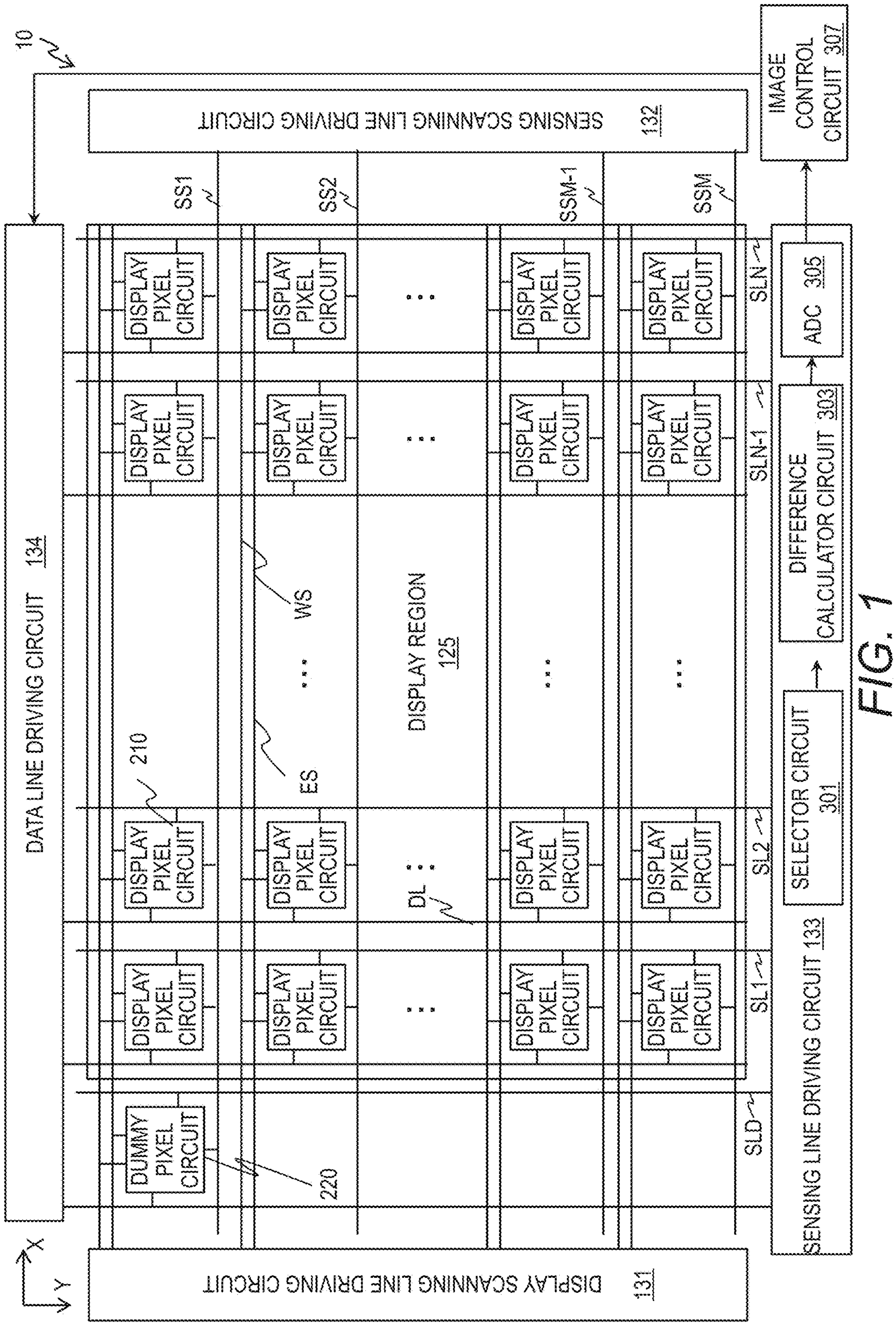
FIG. 1 schematically illustrates a configuration example of an OLED display device.

Hereinafter, embodiments of this disclosure will be described with reference to the accompanying drawings. It should be noted that the embodiments are merely examples to implement this disclosure and not to limit the technical scope of this disclosure.

A display device in an embodiment of this specification evaluates the deterioration in brightness of light-emitting elements. The deterioration in brightness of a light-emitting element can be estimated from the variation in current-voltage characteristic of the light-emitting element. However, variation in the characteristic of a light-emitting element may depend on environmental change more than the deterioration caused by accumulated light emission time. For example, the variation in the characteristic of an OLED element caused by temperature change is much larger than the variation caused by deterioration of the OLED element.

For this reason, measuring the variation in the characteristic caused by deterioration needs to cover a wide range of voltage (current), which makes it more difficult to accurately measure the variation in the characteristic caused by deterioration. To measure a small variation in a wide range, a measurement circuit having high resolution, such as a high-resolution analog-digital converter, is required. For example, when the temperature is changed from 0° C. to 85° C., the variation in voltage measured from an OLED element is approximately 1 V. In this variation, however, the variation caused by the deterioration of the OLED element is approximately 0.1 V.

A display device in an embodiment of this specification measures the characteristic of light-emitting elements in display pixel circuits for displaying images in comparison to the characteristic of a reference light-emitting element that is precluded from displaying images. This configuration enables accurate evaluation of deterioration in brightness of each light-emitting element with a lower-resolution measurement circuit.

First Embodiment

Configuration of Display Device

The configuration of a display device in an embodiment of this specification is described with reference to FIG. 1. The elements in the drawings may be exaggerated in size or shape for clear understanding of the description. In the following, an OLED display device is described as an example of the display device. The measurement of a characteristic of a light-emitting element in this disclosure is applicable to a light-emitting element different from an OLED element.

FIG. 1 schematically illustrates a configuration example of an OLED display device 10. The OLED display device 10 includes a plurality of display pixel circuits 210 arrayed on a substrate to form a display region 125 and a dummy pixel circuit 220 disposed on the substrate but outside the display region 125.

The OLED elements are sealed up by a not-shown structural encapsulation unit. Display driving circuits are disposed in the periphery of the display region 125. Specifically, a display scanning line driving circuit 131, a sensing scanning line driving circuit 132, a sensing line driving circuit 133, and a data line driving circuit 134 are disposed. The OLED display device 10 further includes a image control circuit 307. The image control circuit 307 can be mounted on an anisotropic conductive film (ACF) connected to the substrate. These circuits for controlling the OLED display device 10 can be disposed freely.

Each display pixel circuit 210 includes an OLED element (light-emitting element) and a thin-film transistor (TFT) circuit for controlling light emission of the OLED element. The dummy pixel circuit 220 includes an OLED element and a TFT circuit. In an embodiment of this specification, the dummy pixel circuit 220 and the display pixel circuits 210 have the identical circuit configurations.

The display region 125 in the configuration example of FIG. 1 includes M display pixel circuit rows each composed of a plurality of display pixel circuits 210 aligned along the X-axis. The display pixel circuit rows are disposed one above another along the Y-axis. The display region 125 also includes N display pixel circuit columns each composed of a plurality of display pixel circuits 210 aligned along the Y-axis. The display pixel circuit columns are disposed side by side along the X-axis. The layout of the pixel circuits 210 and 220 can be determined desirably depending on the design. A display pixel row or a display pixel column is a display pixel line.

The OLED element in a display pixel circuit 210 emits a specific color of light. For example, the colors of light emitted from all display pixel circuits 210 can be the same white or different among red, green and blue. The display pixel circuits 210 included in the display region 125 display images in accordance with video data from the external.

The dummy pixel circuit 220 includes a reference OLED element to be referenced to evaluate the deterioration in brightness of the display pixel circuits 210. The dummy pixel circuit 220 is used to evaluate the deterioration in brightness of the display pixel circuits 210 and is precluded from displaying images in accordance with video data. The dummy pixel circuit 220 can be covered with a not-shown shield so as not to be seen from the front.

In the configuration example of FIG. 1, only one dummy pixel circuit 220 is provided on the substrate and it is included in one pixel circuit row together with one display pixel circuit row. A pixel circuit row is a pixel circuit line. The OLED element in the dummy pixel circuit 220 emits the same color of light as the OLED element in one of the display pixel circuits 210. In an embodiment of this specification, it is desirable that a plurality of dummy pixel circuits 220 including an OLED element for each color of light of the OLED elements in the display region 125 be disposed outside the display region 125. Each dummy pixel circuit 220 is used to evaluate the deterioration in brightness of the display pixel circuits 210 including an OLED element for the same color of light. As a result, the deterioration in brightness of the display pixel circuits 210 can be evaluated more accurately.

Each display pixel circuit row is connected to two display scanning lines WS and ES common to the display pixel circuits therein. The display scanning lines WS and ES extend along the X-axis; in FIG. 1, only the display scanning lines for one display pixel circuit row are provided with reference signs WS and ES by way of example. The display scanning line driving circuit 131 is disposed outside the display region 125 along one side of the display region 125. The display scanning line driving circuit 131 drives the display scanning lines WS and ES to output signals for controlling the display pixel circuits 210 and the dummy pixel circuit 220, if any, connected to those scanning lines WS and ES.

As will be described later, each scanning line WS transmits a selection signal for selecting a pixel circuit row where to write a data signal that determines the brightness of an OLED element. Each scanning line ES transmits an emission control signal for switching ON/OFF the supply of electric current to an OLED element. The dummy pixel circuit 220 is connected to the same scanning lines WS and ES as the display pixel circuits in the corresponding display pixel circuit row and controlled by the signals transmitted by those scanning lines WS and ES.

Each display pixel circuit row is connected to one sensing scanning line that is common to the display pixel circuits therein. FIG. 1 includes M sensing scanning lines SS1 to SSM (M is an integer greater than 1) extending along the X-axis. The sensing scanning line driving circuit 132 is disposed outside the display region 125 on the opposite of the display scanning line driving circuit 131. The sensing scanning line driving circuit 132 drives the sensing scanning lines SS1 to SSM to output signals for controlling the display pixel circuits 210 and the dummy pixel circuit 220, if any, connected to the sensing scanning lines.

As will be described later, each sensing scanning line selects a pixel circuit row to evaluate the deterioration in brightness. A pixel circuit row includes display pixel circuits 210 and a dummy pixel circuit 220 or includes only display pixel circuits 210. The dummy pixel circuit 220 in the configuration example of FIG. 1 is connected to the same sensing scanning line SS1 as the uppermost display pixel circuit row to be selected first among the display pixel circuit rows. In the case where the display region 125 includes OLED elements for a plurality of different colors of light, a plurality of dummy pixel circuits each including an OLED element for a different color of light can be connected to the sensing scanning line SS1.

Each display pixel circuit column is connected to one data line DL common to the display pixel circuits therein. The data lines DL extend along the Y-axis; in FIG. 1, one of the data lines is provided with a reference sign DL by way of example. The data line driving circuit 134 is disposed outside the display region 125 at a location different from the other display driving circuits. The data line driving circuit 134 in the example of FIG. 1 is disposed along the upper side of the display region 125. The data line driving circuit 134 drives the data lines DL to output data signals specifying the emission intensities of the OLED elements to the data lines DL.

The dummy pixel circuit 220 in the configuration example of FIG. 1 is connected to a data line DL that is not connected to any display pixel circuit 210. In an embodiment of this specification, no data signal is written from the data line DL to the dummy pixel circuit 220. In the case where dummy pixel circuits for a plurality of colors of light are provided, the dummy pixel circuits can be connected to different data lines DL.

FIG. 1 illustrates (N+1) sensing lines SLD and SL1 to SLN (N is an integer greater than 1) extending along the Y-axis. The display scanning lines, the sensing scanning lines, and the sensing lines are control lines. The sensing line driving circuit 133 is disposed outside the display region 125 on the opposite of the data line driving circuit 134. The sensing line driving circuit 133 drives the sensing lines SLD and SL1 to SLN to measure the characteristic of the display pixel circuits 210 and receives signals indicating the characteristic of the OLED elements from the display pixel circuits 210 and the dummy pixel circuit 220 connected to the sensing lines.

In the configuration example of FIG. 1, the sensing line SLD is connected to one dummy pixel circuit 220 and not connected to any display pixel circuit 210. The sensing lines SL1 to SLN are each connected to a display pixel circuit column. Each sensing line transmits a characteristic signal of the pixel circuit selected by a sensing scanning line out of the pixel circuits connected to the sensing line to the sensing line driving circuit 133.

The sensing line driving circuit 133 includes a selector circuit 301, a difference calculator circuit 303, and an AD converter (ADC) 305. The selector circuit 301 selects a sensing line from which to receive a signal. The difference calculator circuit 303 calculates the difference in characteristic signal between the selected display pixel circuit and the dummy pixel circuit. The AD converter 305 converts an analog signal to a digital signal. The details of these circuit elements will be described later.

The image control circuit 307 generates data signals from video data received from the external to display an image corresponding to the video data in the display region 125 and controls the display driving circuits 131 to 134. The image control circuit 307 acquires data indicating the characteristic of the OLED elements in the display pixel circuits 210. Specifically, the image control circuit 307 acquires data indicating the differences in characteristic of the display OLED elements in the display pixel circuits 210 from the reference OLED element in the dummy pixel circuit 220. The image control circuit 307 determines the data signal to be supplied to each display pixel circuit 210 based on the data.

The layout of the display scanning lines, sensing scanning lines, data lines, and sensing lines is not limited to the example of FIG. 1. In the configuration example of FIG. 1, the pixel circuits (display pixel circuits and a dummy pixel circuit) connected to the same display scanning line are connected to the same sensing scanning line. Unlike this configuration, the pixel circuits connected to the same display scanning line can be connected to different sensing scanning lines. The dummy pixel circuit 220 can have a circuit configuration different from the circuit configuration of the display pixel circuits 210.

Circuit Configuration

A display pixel circuit 210 includes a display OLED element and a dummy pixel circuit 220 includes a reference OLED element. The pixel circuits 210 and 220 control brightness of their OLED elements by controlling the electric current to be supplied to the anode electrode of the OLED element. In the example described in the following, the display pixel circuits 210 and the dummy pixel circuit 220 have the identical configurations. Hence, the deterioration in brightness of the OLED element in a display pixel circuit 210 is evaluated more accurately.

Figure 2:
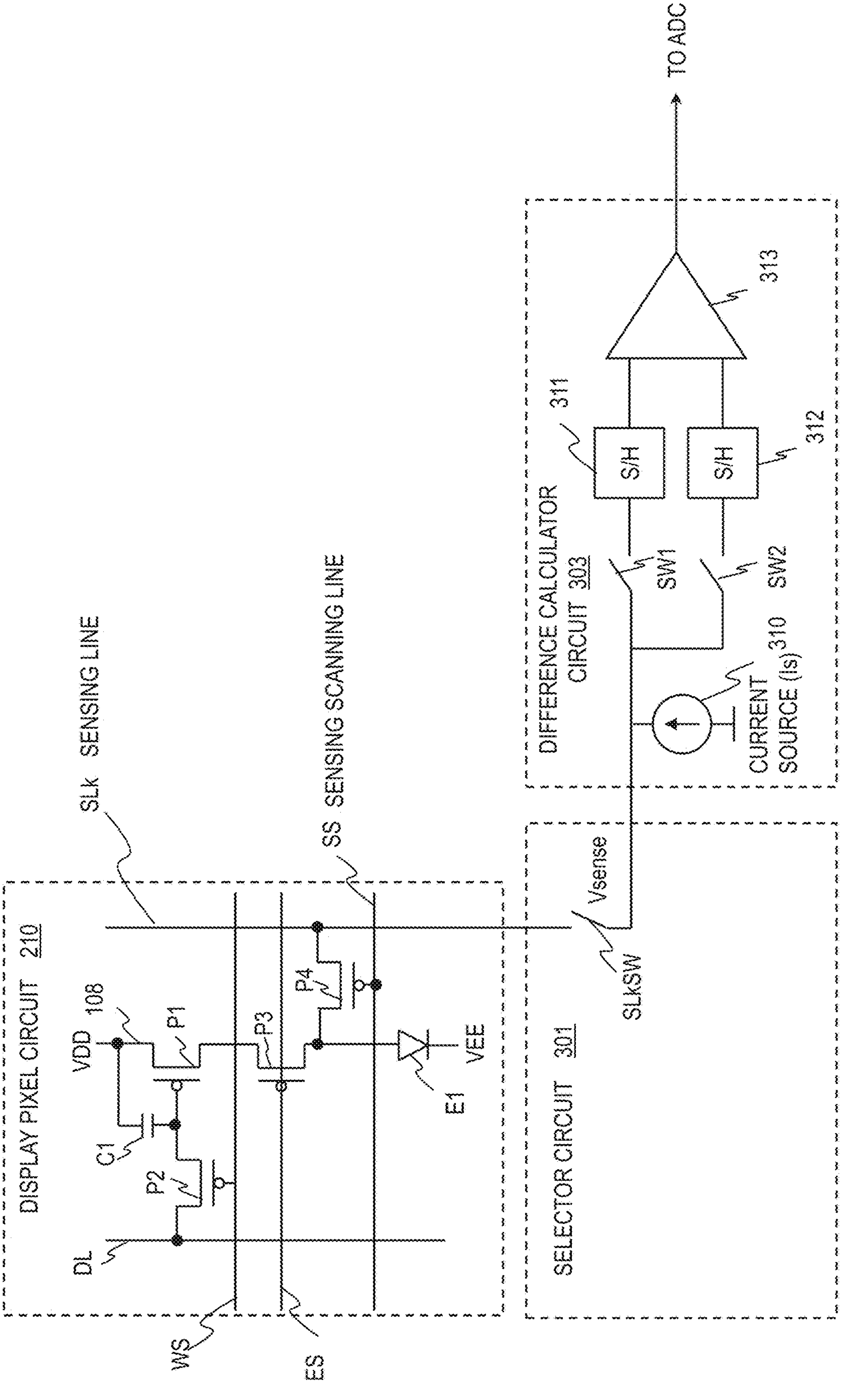
FIG. 2 schematically illustrates a configuration example of a pixel circuit and a sensing line driving circuit.

FIG. 2 schematically illustrates a configuration example of a display pixel circuit 210 and the sensing line driving circuit 133. The dummy pixel circuit 220 has the same circuit configuration as the display pixel circuit 210. The display pixel circuit 210 includes an OLED element E1, a driving transistor P1, a selection transistor P2 for displaying an image, an emission transistor P3, and a storage capacitor C1. The display pixel circuit 210 further includes a selection transistor P4 for measuring the characteristic of the OLED element E1. The transistors in the configuration example of FIG. 2 are p-type TFTs.

The selection transistor P2 is a switch for selecting a pixel circuit to which to write a data signal. The gate of the selection transistor P2 is connected to a display scanning line WS. The source is connected to a data line DL. The drain is connected to the gate of the driving transistor P1.

The driving transistor P1 is a transistor (driving TFT) for driving the OLED element E1. The gate of the driving transistor P1 is connected to the drain of the selection transistor P2. The source of the driving transistor P1 is connected to a power line 108 for transmitting a power supply potential VDD. The drain of the driving transistor P1 is connected to the source of the emission transistor P3. The storage capacitor C1 is provided between the gate and the source of the driving transistor P1.

The emission transistor P3 is a switch for controlling whether to supply driving current to the OLED element E1. The gate of the emission transistor P3 is connected to a display scanning line ES. The source of the emission transistor P3 is connected to the drain of the driving transistor P1. The drain of the emission transistor P3 is connected to the anode of the OLED element E1. The cathode of the OLED element E1 is supplied with a cathode power supply potential VEE.

The selection transistor P4 for characteristic measurement is a switch for selecting a pixel circuit to measure the characteristic of the OLED element E1 therein. The gate of the selection transistor P4 is connected to a sensing scanning line SS. The sensing scanning line SS means one of the sensing scanning lines. An end of the source/drain is connected to the anode of the OLED element E1 and the other end is connected to a sensing line SLk. The sensing line SLk means the k-th sensing line.

Next, operation of the display pixel circuit 210 to display an image is described. The display scanning line driving circuit 131 outputs a selection pulse to the scanning line WS to turn on the selection transistor P2. The data voltage supplied from the data line driving circuit 134 through the data line DL is stored to the storage capacitor C1. The storage capacitor C1 holds the stored voltage throughout one frame period. The conductance of the driving transistor P1 changes in an analog manner in accordance with the stored voltage, so that the driving transistor P1 supplies a forward bias current corresponding to an emission intensity to the OLED element E1.

The emission transistor P3 is located on the supply path of the driving current. The display scanning line driving circuit 131 outputs a control signal to the scanning line ES to control ON/OFF of the emission transistor P3. When the emission transistor P3 is ON, the driving current is supplied to the OLED element E1. When the emission transistor P3 is OFF, this supply is stopped. The lighting period (duty ratio) in one frame period can be controlled by controlling ON/OFF of the emission transistor P3.

Next, the circuit configuration for measuring the characteristic of the OLED element E1 in the display pixel circuit 210 is described. The selector circuit 301 includes switches each associated with a sensing line. FIG. 2 illustrates a given switch SLKSW connected to the sensing line SLk by way of example. The selector circuit 301 includes switches for all sensing lines SLD and SL1 to SLN. The selector circuit 301 serially selects the switches to select a sensing line for transmitting the signal of the OLED element E1 to be evaluated. Hence, the number of difference calculator circuits 303 and AD converters 305 can be made small.

The difference calculator circuit 303 includes a current source 310, switches SW1 and SW2, sample and hold circuits (S/H) 311 and 312, and a difference amplifier circuit (operational amplifier circuit) 313. The sensing line driving circuit 133 in FIG. 2 measures the voltage of a sensing line under a constant current (voltage sensing method). This voltage represents the current-voltage characteristic of an OLED element.

Measurement of Characteristic of Display Pixel Circuits

Figure 3:
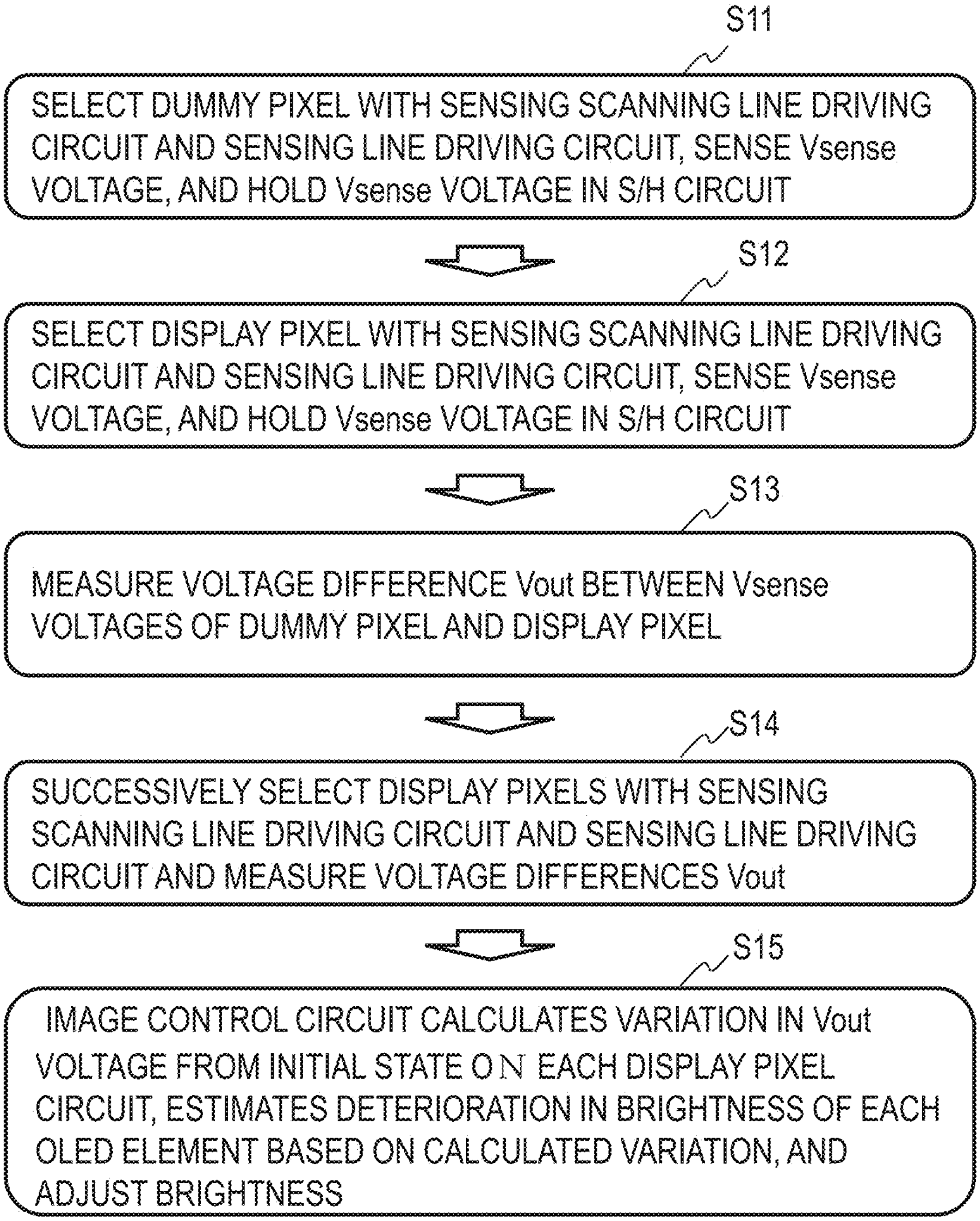
FIG. 3 is a flowchart of an example of the operation to measure the current-voltage characteristic of OLED elements in display pixel circuits.

Operation to measure a characteristic of the OLED elements E1 in the display pixel circuits 210 is described. FIG. 3 is a flowchart of an example of the operation to measure the current-voltage characteristic of the OLED elements E1 in the display pixel circuits 210. The OLED display device 10 selects the dummy pixel circuit 220 with the sensing scanning line driving circuit 132 and the sensing line driving circuit 133, senses a Vsense voltage of the sensing line SLD, and holds the voltage in the sample and hold circuit 311 (S11).

Next, the OLED display device 10 selects a display pixel circuit 210 with the sensing scanning line driving circuit 132 and the sensing line driving circuit 133, senses a Vsense voltage of the sensing line, and holds the voltage in the sample and hold circuit 312 (S12).

Next, the OLED display device 10 measures the voltage difference Vout between the Vsense voltages of the dummy pixel circuit and the display pixel circuit with the differential amplifier circuit 313 (S13). Further, the OLED display device 10 successively selects display pixel circuits 210 with the sensing scanning line driving circuit 132 and the sensing line driving circuit 133 to measure the voltage differences Vout (S14).

The image control circuit 307 calculates the variation in Vout voltage from the initial state on each display pixel circuit, estimates the deterioration in brightness of each OLED element from the variation, and adjusts the brightness based on the estimation (S15).

More specific circuit operation is described. The selection transistors P4 for characteristic measurement are kept OFF during the operation of displaying an image. The measurement of the characteristic of the OLED elements E1 can be conducted in a period other than the period where video data is displayed (display period), for example, during a start-up sequence or a shut-down sequence of the display device 10.

To measure the characteristic of an OLED element E1, the sensing scanning line driving circuit 132 outputs a selection pulse to the sensing scanning line SS to turn ON the selection transistor P4. As a result, the sensing line SLk and the OLED element E1 are electrically connected. The sensing line driving circuit 133 receives a signal indicating the characteristic of the OLED element E1 from the sensing line SLk.

The selector circuit 301 selects the sensing line SLD for the dummy pixel circuit 220, or turns ON the switch of the sensing line SLD while keeping the switches of the other sensing lines OFF. The current source 310 supplies the sensing line SLD with a constant current Is through the switch of the sensing line SLD. The difference calculator circuit 303 closes the switch SW1 to supply the voltage of the sensing line SLD to the sample and hold circuit 311 and thereafter, opens the switch SW1. The switch SW2 is kept OFF. The sample and hold circuit 311 holds the voltage of the sensing line SLD at the time when the switch SW1 is opened.

Next, the selector circuit 301 selects the sensing line of the display pixel circuit 210 to be evaluated. Assuming that the sensing line SLk is to be selected, the selector circuit 301 turns ON the switch SLKSW for the sensing line SLk and keeps the switches of the other sensing lines OFF. The current source 310 supplies the constant current Is to the sensing line SLk through the switch SLKSW.

The difference calculator circuit 303 closes the switch SW2 to supply the voltage of the sensing line SLk to the sample and hold circuit 312 and thereafter, opens the switch SW2. The switch SW1 is kept OFF. The sample and hold circuit 312 holds the voltage of the sensing line SLk at the time when the switch SW2 is opened.

The difference amplifier circuit 313 outputs a signal Vout that is proportional to the difference (Vsense1−Vsense2) between the voltages held by the two sample and hold circuits 311 and 312. In other words, the difference amplifier circuit 313 outputs a signal proportional to the difference between the reference signal (Vsense1) indicating the current-voltage characteristic of the reference OLED element of the dummy pixel circuit 220 and the characteristic signal (Vsense2) indicating the current-voltage characteristic of the display OLED element of the display pixel circuit 210 to be evaluated. The AD converter 305 converts the analog signal from the difference amplifier circuit 313 to a digital value.

The pixel circuit in FIG. 2 is an example; the pixel circuit can have other circuit configurations. Although the pixel circuit in FIG. 2 includes p-channel type of TFTs, the pixel circuit can include n-channel type of TFTs. The switches of the selector circuit 301 and the difference calculator circuit 303 can be TFTs of the same type as the TFTs in the pixel circuit.

Figure 4:
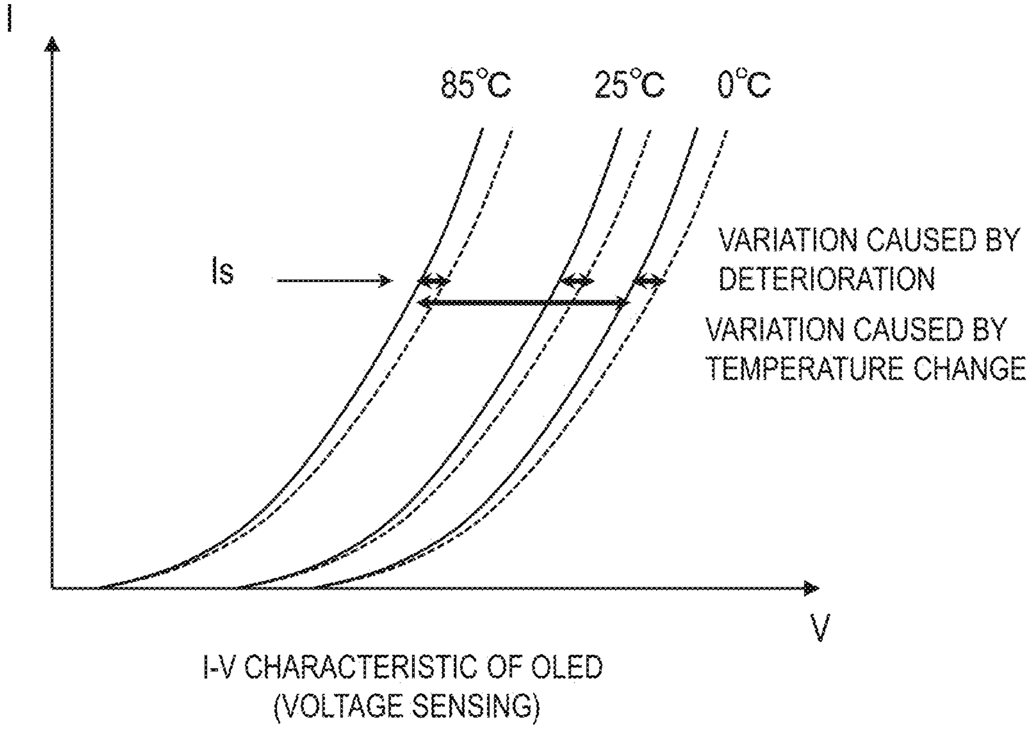
FIG. 4 schematically illustrates the variation in current-voltage characteristic of an OLED element caused by temperature change and the variation caused by deterioration.

FIG. 4 schematically illustrates the variation in current-voltage characteristic (I-V characteristic) of an OLED element caused by temperature change and the variation caused by deterioration. In the graph of FIG. 4, the horizontal axis represents the voltage of the OLED element and the vertical axis represents current. FIG. 4 schematically illustrates the variation in voltage of the OLED element caused by temperature change and the variation caused by deterioration under a constant current Is. Specifically, FIG. 4 illustrates variations in current-voltage characteristic caused by deterioration at the temperatures of 85° C., 25° C., and 0° C. As the temperature falls from 85° C. to 0° C., the voltage of the OLED element in response to the constant current Is significantly increases. Compared to this variation, the variation in voltage caused by deterioration is small at any of the temperatures 85° C., 25° C. and 0° C.

The OLED display device 10 in this embodiment enables the effect of temperature onto the measured current-voltage characteristic to be small by referring to the difference between the current-voltage characteristic of the reference OLED element and the current-voltage characteristic of the OLED element to be evaluated. Accordingly, the resolution required for the AD converter 305 can be lowered.

Figure 5:
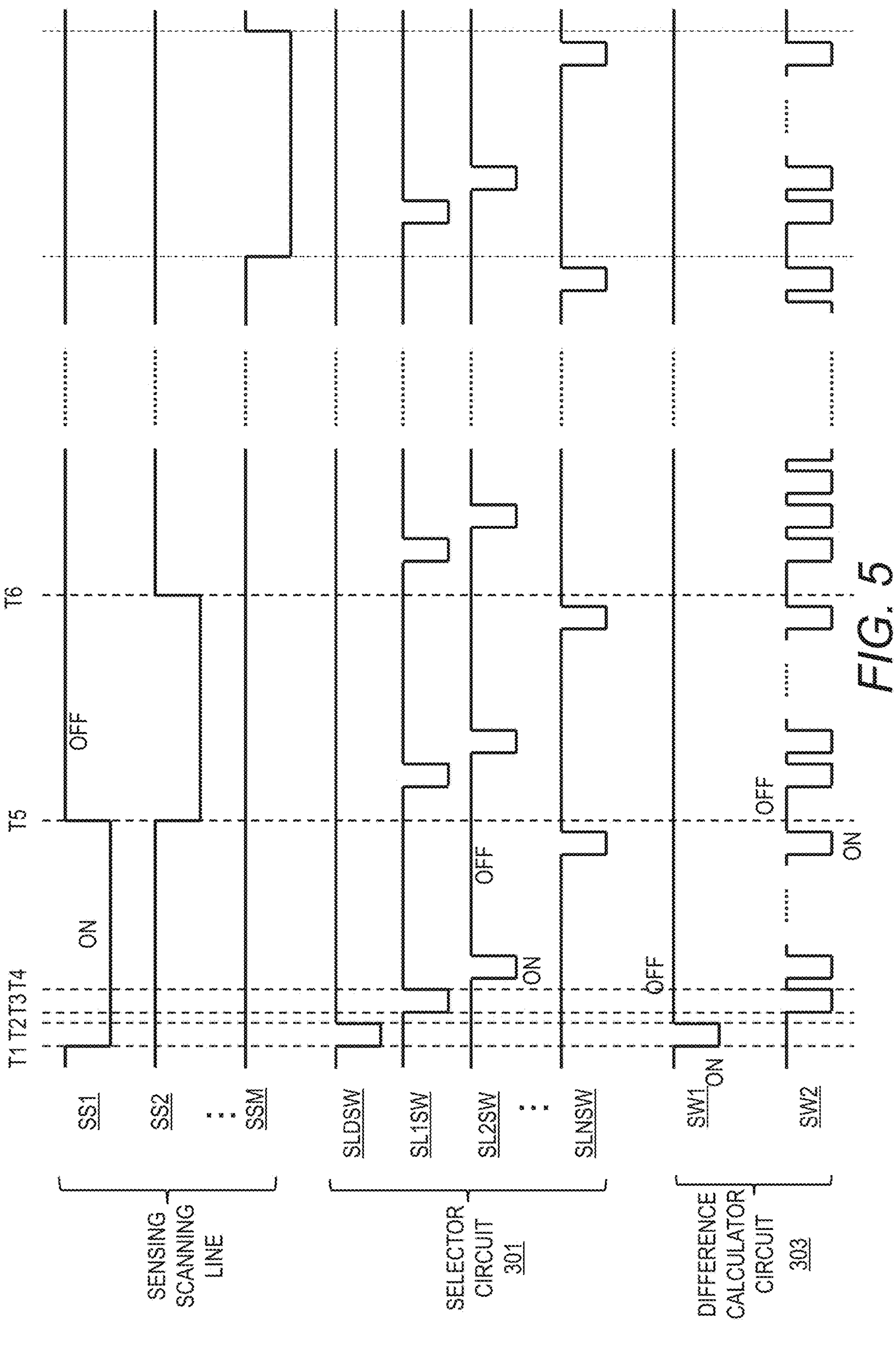
FIG. 5 is a timing chart of the control signals in the configuration example illustrated in FIGS. 1 and 2.

FIG. 5 is a timing chart of the control signals in the configuration example illustrated in FIGS. 1 and 2. Specifically, FIG. 5 illustrates temporal variation of the control signals on the sensing scanning lines SS1 to SSM, the control signals for the switches SLDSW and SL1SW to SLNSW in the selector circuit 301, and the control signals for the switches SW1 and SW2 in the difference calculator circuit 303. The switches SLDSW and SL1SW to SLNSW are switches in the selector circuit 301 for the sensing lines SLD and SL1 to SLN.

Temporal variation of the control signals for measuring the current-voltage characteristic of display pixel circuits 210 is described. During the measurement of the current-voltage characteristic, the transistors P2 and P3 in the pixel circuits are OFF.

At a time T1, the signal on the sensing scanning line SS1 changes from High to Low. As a result, the pixel circuit row connected to the sensing scanning line SS1 is selected, which means the selection transistors P4 in the pixel circuits turn ON. The sensing scanning line SS1 is connected to the dummy pixel circuit 220 as well as the display pixel circuits 210. The signals on the other sensing scanning lines are High and the selection transistors P4 in the pixel circuits connected to those lines remain OFF.

Furthermore, the control signal for the switch SLDSW in the selector circuit 301 changes from High to Low, so that the switch SLDSW turns ON. The other switches SL1SW to SLNSW remain OFF. In addition, the control signal for the switch SW1 in the difference calculator circuit 303 changes from High to Low, so that the switch SW1 turns ON. The switch SW2 remains OFF.

Since the selection transistor P4 in the dummy pixel circuit 220 is ON and the switch SLDSW in the selector circuit 301 is ON, the constant current from the constant current source 310 in the difference calculator circuit 303 flows to the sensing line SLD and the OLED element E1. Since the switch SW1 in the difference calculator circuit 303 is ON, the sample and hold circuit 311 receives the signal indicating the voltage of the OLED element E1 in the dummy pixel circuit 220.

At a subsequent time T2, the control signal for the switch SLDSW in the selector circuit 301 changes from Low to High, so that the switch SLDSW turns OFF. Further, the control signal for the switch SW1 in the difference calculator circuit 303 changes from Low to High, so that the switch SW1 turns OFF. The other control signals do not change. Because of the two switches turning OFF, the signal indicating the voltage of the OLED element E1 in the dummy pixel circuit 220 is held in the sample and hold circuit 311.

In an embodiment of this specification, the switch SW1 turns OFF immediately after the switch SLDSW turns OFF. Accordingly, the sample and hold circuit 311 can hold the signal on the proper sensing line SLD more certainly. This configuration applies to the control of the other pairs of a switch in the selector circuit 301 and a switch in the difference calculator circuit 303 and the other embodiments.

At a subsequent time T3, the control signal for the switch SL1SW in the selector circuit 301 changes from High to Low, so that the switch SL1SW turns ON. The other switches SLDSW and SL2SW to SLNSW remain OFF. In addition, the control signal for the switch SW2 in the difference calculator circuit 303 changes from High to Low, so that the switch SW2 turns ON. The switch SW1 remains OFF.

At a subsequent time T4, the control signal for the switch SL1SW in the selector circuit 301 changes from Low to High, so that the switch SL1SW turns OFF. Further, the control signal for the switch SW2 in the difference calculator circuit 303 changes from Low to High, so that the switch SW2 turns OFF. The other control signals do not change. Because of the two switches turning OFF, the signal indicating the voltage of the OLED element E1 in the display pixel circuit 210 connected to the sensing scanning line SS1 and the sensing line SL1 is held in the sample and hold circuit 312.

The difference amplifier circuit 313 outputs a signal proportional to the difference between the voltages (signals) held by the two sample and hold circuits 311 and 312. This signal is a signal proportional to the difference of the characteristic signal indicating the current-voltage characteristic of the display OLED element in the display pixel circuit 210 selected by the sensing scanning line SS1 and the switch SL1SW from the reference signal indicating the current-voltage characteristic of the reference OLED element in the dummy pixel circuit 220. The AD converter 305 converts the analog signal from the difference amplifier circuit 313 into a digital value. The image control circuit 307 determines the adjustment parameter for the brightness of this display pixel circuit 210 based on the received data. In determining the adjustment parameter, the temperature detected by a temperature sensor may be considered.

The foregoing processing described about the switch SL1SW is performed on the switches SL2SW to SLNSW for the remaining sensing lines. The characteristic signals of the display pixel circuits 210 connected to the sensing scanning line SS1 successively enter the sample and hold circuit 312 from the sensing lines SL2 to SLN. Data representing the signals proportional to the differences of the characteristic signals of the display pixel circuits 210 from the reference signal of the dummy pixel circuit 220 held in the sample and hold circuit 311 are supplied to the image control circuit 307.

At a subsequent time T5, the signal on the sensing scanning line SS1 changes from Low to High. As a result, the pixel circuit row connected to the sensing scanning line SS1 becomes unselected. Further, the signal on the sensing scanning line SS2 changes from High to Low. As a result, the pixel circuit row connected to the sensing scanning line SS2 becomes selected. The sensing scanning line SS2 is connected to only display pixel circuits 210 and not connected to a dummy pixel circuit. The signals on the other sensing scanning line are High and the selection transistors P4 in the pixel circuits connected to those lines remain OFF.

The signal on the sensing scanning line SS2 is kept Low from the time T5 to a time T6. During this period, the characteristic signals of the display pixel circuits 210 selected by the sensing scanning line SS2 successively enter the sample and hold circuit 312 as described above. The sample and hold circuit 311 holds the reference signal indicating the characteristic of the dummy pixel circuit 220. Accordingly, data representing the signals proportional to the differences of the characteristic signals of the display pixel circuits 210 connected to the sensing scanning line SS2 from the reference signal of the dummy pixel circuit 220 are supplied to the image control circuit 307.

Subsequently, the sensing scanning lines SS3 to SSM are turned ON one after another and the foregoing processing described about the sensing scanning line SS2 is performed repeatedly. As a result, the current-voltage characteristic of the OLED elements in all display pixel circuits 210 are measured in comparison to the current-voltage characteristic of the OLED element of the dummy pixel circuit 220.

As mentioned above, dummy pixel circuits for different colors of light can be employed. For example, dummy pixel circuits for red, green, and blue light are connected to the sensing scanning line SS1. The OLED display device 10 conducts measurement on display pixel circuits for a first color of light in comparison to the dummy pixel circuit for the first color of light, measurement on display pixel circuits for a second color of light in comparison to the dummy pixel circuit for the second color of light, and measurement on display pixel circuits for a third color of light in comparison to the dummy pixel circuit for the third color of light.

Second Embodiment

Figure 6:
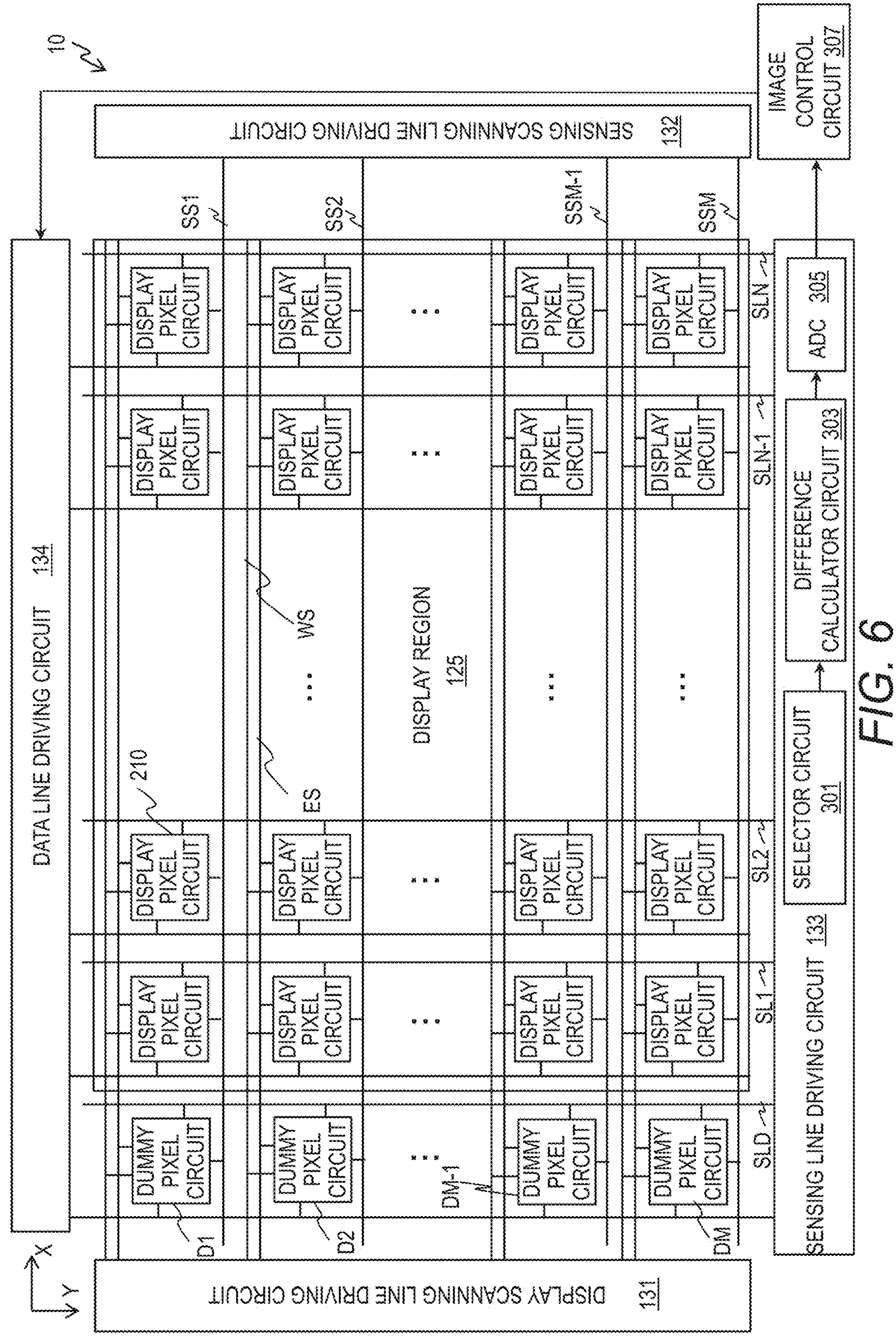
FIG. 6 schematically illustrates a configuration example of an OLED display device in the second embodiment.

An OLED display device in another embodiment of this specification is described. The following mainly describes differences from the OLED display device in the first embodiment. FIG. 6 schematically illustrates a configuration example of the OLED display device 10 in this embodiment. Compared to the configuration example of FIG. 1, dummy pixel circuits D1 to DM are connected to sensing scanning lines SS1 to SSM. The dummy pixel circuits D1 to DM are provided at different positions with respect to the Y-axis.

The dummy pixel circuit Dk is selected by the sensing scanning line SSk (k is one of the values of 1 to M). The sensing scanning line SSk is connected to a plurality of display pixel circuits 210 and the dummy pixel circuit Dk. Each pixel circuit row includes a plurality of display pixel circuits 210 and one dummy pixel circuit.

The dummy pixel circuits D1 to DM are connected to a sensing line SLD. The signal from the dummy pixel circuit Dk selected by the sensing scanning line SSK enters the sensing line driving circuit 133 through the sensing line SLD. In an embodiment of this specification, all dummy pixel circuits have identical circuit configurations, which can also be identical to the circuit configuration of the display pixel circuits 210.

It is desirable that each pixel circuit row include dummy pixel circuits including OLED elements E1 for different colors of light. For example, three dummy pixel circuits including an OLED element for red light, an OLED element for green light, and an OLED element for blue light are connected to each sensing scanning line. Providing a plurality of dummy pixel circuits at different positions enables the deterioration evaluation of the display pixel circuits to be more dependent on the temperature distribution along the Y-axis on the substrate. Not all of the sensing scanning lines have to be connected to a dummy pixel circuit.

Figure 7:
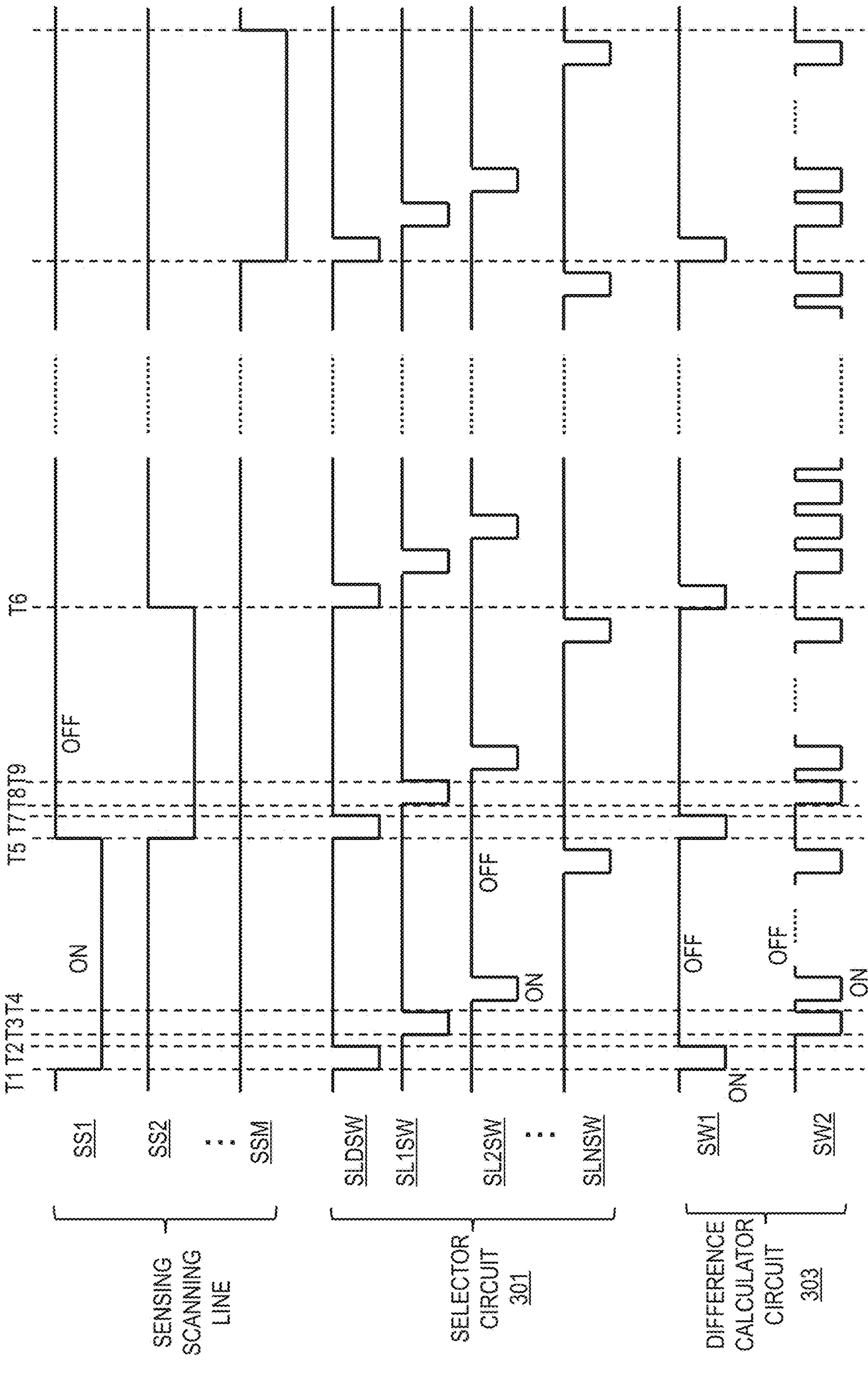
FIG. 7 is a timing chart of the control signals in the second embodiment.

FIG. 7 is a timing chart of the control signals in this embodiment. The following mainly describes differences from the timing chart of FIG. 5. The operation from the time T1 to immediately before the time T5 is the same as the one in the timing chart of FIG. 5, except that the dummy pixel circuit D1 is selected.

At the time T5, the signal on the sensing scanning line SS2 changes from High to Low, so that the pixel circuit row connected to the sensing scanning line SS2 is selected. This means that the selection transistors P4 in the pixel circuits turn ON. The sensing scanning line SS2 is connected to not only the display pixel circuits 210 but also the dummy pixel circuit D2. The signals on the other sensing scanning lines are High and the selection transistors P4 in the pixel circuits connected to those lines remain OFF.

Furthermore, the control signal for the switch SLDSW in the selector circuit 301 changes from High to Low, so that the switch SLDSW turns ON. The other switches SL1SW to SLNSW remain OFF. In addition, the control signal for the switch SW1 in the difference calculator circuit 303 changes from High to Low, so that the switch SW1 turns ON. The switch SW2 remains OFF.

Since the selection transistor P4 in the dummy pixel circuit D2 is ON and the switch SLDSW in the selector circuit 301 is ON, the constant current from the constant current source 310 in the difference calculator circuit 303 flows to the sensing line SLD and the OLED element E1. Since the switch SW1 in the difference calculator circuit 303 is ON, the sample and hold circuit 311 receives the voltage of the sensing line SLD, in other words the signal indicating the voltage of the OLED element E1 in the dummy pixel circuit D2.

At a subsequent time T7, the control signal for the switch SLDSW in the selector circuit 301 changes from Low to High, so that the switch SLDSW turns OFF. Furthermore, the control signal for the switch SW1 in the difference calculator circuit 303 changes from Low to High, so that the switch SW1 turns OFF. The other control signals do not change. Because of the two switches turning OFF, the signal indicating the voltage of the OLED element E1 in the dummy pixel circuit D2 is held in the sample and hold circuit 311.

At a subsequent time T8, the control signal for the switch SL1SW in the selector circuit 301 changes from High to Low, so that the switch SL1SW turns ON. The other switches SLDSW and SL2SW to SLNSW remain OFF. In addition, the control signal for the switch SW2 in the difference calculator circuit 303 changes from High to Low, so that the switch SW2 turns ON. The switch SW1 remains OFF.

At a subsequent time T9, the control signal for the switch SL1SW in the selector circuit 301 changes from Low to High, so that the switch SL1SW turns OFF. Furthermore, the control signal for the switch SW2 in the difference calculator circuit 303 changes from Low to High, so that the switch SW2 turns OFF. The other control signals do not change. Because of the two switches turning OFF, the signal indicating the voltage of the OLED element E1 in the display pixel circuit 210 connected to the sensing scanning line SS2 and the sensing line SL1 is held in the sample and hold circuit 312.

The difference amplifier circuit 313 outputs a signal proportional to the difference between the voltages (signals) held by the two sample and hold circuits 311 and 312. This signal is a signal proportional to the difference of the characteristic signal indicating the current-voltage characteristic of the display OLED element in the display pixel circuit 210 selected by the sensing scanning line SS2 and the switch SL1SW from the reference signal indicating the current-voltage characteristic of the reference OLED element in the dummy pixel circuit 220. The AD converter 305 converts the analog signal from the difference amplifier circuit 313 into a digital value.

The foregoing processing described about the switch SL1SW is performed on the switches SL2SW to SLNSW for the remaining sensing lines. The characteristic signals of the display pixel circuits 210 connected to the sensing scanning line SS2 successively enter the sample and hold circuit 312 from the sensing lines SL2 to SLN. Data representing the signals proportional to the differences of the characteristic signals of the display pixel circuits 210 from the reference signal of the dummy pixel circuit 220 held in the sample and hold circuit 311 are supplied to the image control circuit 307.

At a subsequent time T6, the signal on the sensing scanning line SS2 changes from Low to High. As a result, the pixel circuit row connected to the sensing scanning line SS2 becomes unselected. Further, the signal on the next sensing scanning line SS3 that is not shown in FIG. 7 changes from High to Low. As a result, the pixel circuit row connected to the sensing scanning line SS3 becomes selected. The processing described about the sensing scanning line SS2 is performed on the sensing scanning line SS3.

Subsequently, the sensing scanning lines SS4 to SSM are turned ON one after another and the processing described about the sensing scanning line SS2 is performed repeatedly. As a result, the current-voltage characteristic of the OLED elements in all display pixel circuits 210 are measured in comparison to the current-voltage characteristic of the OLED elements in the dummy pixel circuits D1 to DM.

Third Embodiment

Figure 8:
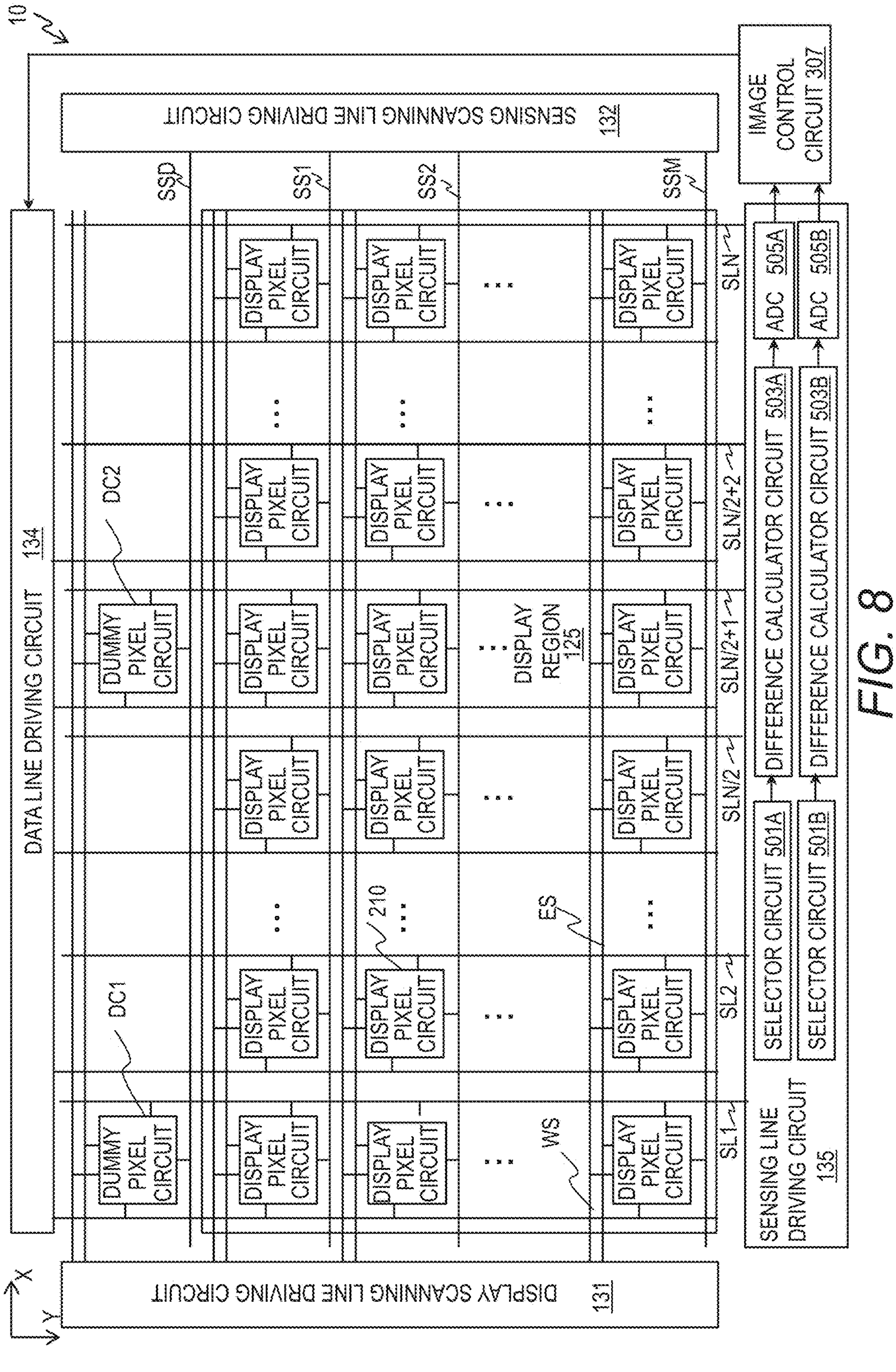
FIG. 8 schematically illustrates a configuration example of an OLED display device in the third embodiment.

An OLED display device in another embodiment of this specification is described. The following mainly describes differences from the OLED display device in the first embodiment. FIG. 8 schematically illustrates a configuration example of the OLED display device 10 in this embodiment. In place of the dummy pixel circuit 220 in the configuration example of FIG. 1, dummy pixel circuits DC1 and DC2 are disposed on the upper side of the display region 125.

The dummy pixel circuits DC1 and DC2 are connected to a sensing scanning line SSD. No display pixel circuits 210 are connected to the sensing scanning line SSD. The sensing scanning line SSD is selected first in the successive selection of the sensing scanning lines. The dummy pixel circuit DC1 is connected to the sensing line SL1 and the dummy pixel circuit DC2 is connected to the sensing line SLN/2+1. In this embodiment, N is an even number.

As will be described later, the dummy pixel circuit DC1 provides a reference characteristic signal for measuring the characteristic of the display pixel circuits connected to the sensing lines SL1 to SLN/2 and the dummy pixel circuit DC2 provides a reference characteristic signal for measuring the characteristic of the display pixel circuits connected to the sensing lines SLN/2+1 to SLN. The dummy pixel circuits DC1 and DC2 are at different positions with respect to the X-axis. Accordingly, this configuration enables the temperature distribution along the X-axis on the display panel to less affect the measured current-voltage characteristic of the display pixel circuits 210.

The OLED display device 10 includes a sensing line driving circuit 135 in place of the sensing line driving circuit 133 in FIG. 1. The sensing line driving circuit 135 includes two sets of circuits for measuring the characteristic of the OLED elements in the display pixel circuits 210. One set includes a selector circuit 501A, a difference calculator circuit 503A, and an AD converter 505A. The other set includes a selector circuit 501B, a difference calculator circuit 503B, and an AD converter 505B.

The first circuit set measures the characteristic of the display pixel circuits connected to the sensing lines SL1 to SLN/2 and the second circuit set measures the characteristic of the display pixel circuits connected to the sensing lines SLN/2+1 to SLN. These two circuit sets perform their processing (first processing and second processing) in parallel. As a result, the selection time per pixel circuit can be increased or expedited processing becomes available.

Figure 9:
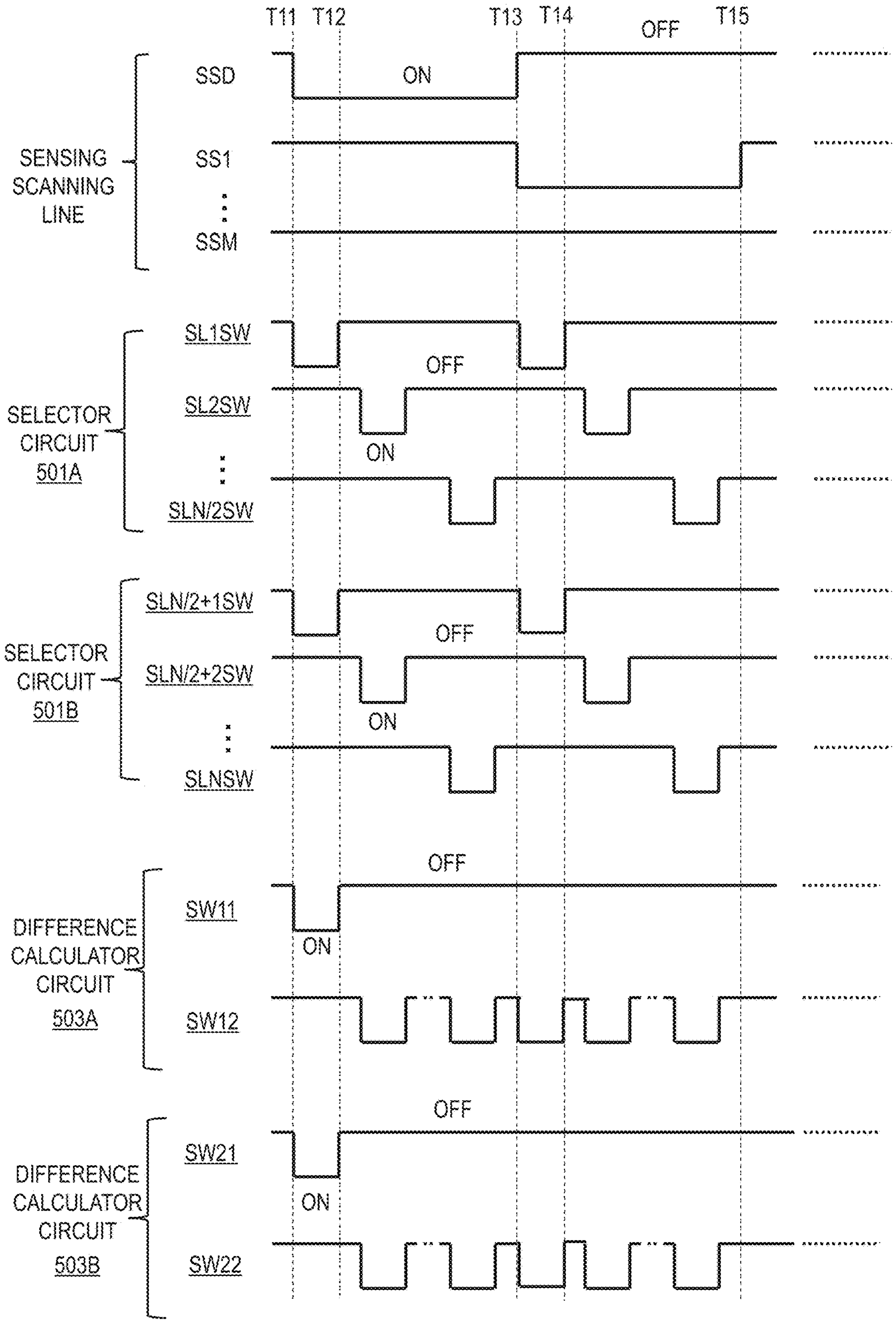
FIG. 9 is a timing chart of the control signals in the configuration example illustrated in FIG. 8.

Each of the selector circuits 501A and 501B includes switches for the sensing lines assigned thereto, like the selector circuit 301 illustrated in FIG. 2. As illustrated in FIG. 9, the selector circuit 501A includes switches SL1SW to SLN/2SW for switching connection and disconnection of the sensing lines SL1 to SLN/2 and the selector circuit 501B includes switches SLN/2+1SW to SLNSW for switching connection and disconnection of the sensing lines SLN2+1 to SLN.

Each of the difference calculator circuit 503A and 503B includes a constant current source, two switches, and two sample and hold circuits, like the difference calculator circuit 303 illustrated in FIG. 2. As illustrated in FIG. 9, the difference calculator circuit 503A includes switches SW11 and SW12 and the difference calculator circuit 503B includes switches SW21 and SW22.

FIG. 9 is a timing chart of the control signals in the configuration example illustrated in FIG. 8. Specifically, FIG. 9 illustrates temporal variation of the control signals on the sensing scanning lines SSD and SS1 to SSM, the control signals for the switches SL1SW to SLN/2SW in the selector circuit 501A, and the control signals for the switches SLN2+1SW to SLNSW in the selector circuit 501B. The switches SL1SW to SLNSW are switches for the sensing lines SL1 to SLN.

FIG. 9 further illustrates temporal variation of the control signals for the switches SW11 and SW12 in the difference calculator circuit 503A and the control signals for the switches SW21 and SW22 in the difference calculator circuit 503B. Each of the switches SW11 and SW12 switches connection and disconnection between the associated sample and hold circuit and the selector circuit 501A. Each of the switches SW21 and SW22 switches connection and disconnection between the associated sample and hold circuit and the selector circuit 501B.

At a time T11, the signal on the sensing scanning line SSD changes from High to Low. As a result, the pixel circuit row connected to the sensing scanning line SSD is selected, which means that the two dummy pixel circuits DC1 and DC2 are selected. The signals on the other sensing scanning lines are High and the pixel circuit rows connected to those lines are unselected.

Furthermore, the control signal for the switch SL1SW in the selector circuit 501A changes from High to Low, so that the switch SL1SW turns ON. The other switches SL2SW to SLN/2SW in the selector circuit 501A remain OFF.

In addition, the control signal for the switch SLN/2+1SW in the selector circuit 501B changes from High to Low, so that the switch SLN/2+1SW turns ON. The other switches SLN/2+2SW to SLNSW in the selector circuit 501B remain OFF.

Still further, the control signal for the switch SW11 in the difference calculator circuit 503A and the control signal for the switch SW21 in the difference calculator circuit 503B change from High to Low, so that the switches SW11 and SW21 turn ON. The switches SW12 and SW22 remain OFF.

The first sample and hold circuit in the difference calculator circuit 503A receives a reference characteristic signal of the reference OLED element E1 in the dummy pixel circuit DC1 from the sensing line SL1 through the switches SL1SW and SW11. The first sample and hold circuit in the difference calculator circuit 503B receives a reference characteristic signal of the reference OLED element E1 in the dummy pixel circuit DC2 from the sensing line SLN/2+1 through the switches SL2+1SW and SW21.

At a subsequent time T12, the control signal for the switch SL1SW in the selector circuit 501A changes from Low to High, so that the switch SL1SW turns OFF. The control signal for the switch SLN/2+1SW in the selector circuit 501B also changes from Low to High, so that the switch SLN/2+1SW turns OFF.

Furthermore, the control signal for the switch SW11 in the difference calculator circuit 503A changes from Low to High, so that the switch SW11 turns OFF. The control signal for the switch SW21 in the difference calculator circuit 503B also changes from Low to High, so that the switch SW21 turns OFF. The other control signals do not change. Because of these switches turning OFF, the signals indicating the voltages of the OLED elements E1 in the dummy pixel circuits DC1 and DC2 are held in the first sample and hold circuits in the difference calculator circuits 503A and 503B.

Subsequently, the sensing lines SL2 to SLN/2 and SLN/2+2 to SLN are successively selected. Since the sensing scanning lines SSD is connected to only the dummy pixel circuits DC1 and DC2, the second sample and hold circuits in the difference calculator circuits 503A and 503B do not hold any signals of pixel circuits. Accordingly, the operation later than the time T12 about the sensing scanning line SSD can be omitted.

At a subsequent time T13, the signal on the sensing scanning line SSD changes from Low to High and the signal on the sensing scanning line SS1 changes from High to Low. As a result, the pixel circuit row connected to the sensing scanning line SS1 is selected. The signals on the other sensing scanning lines are High and the pixel circuit rows connected to those lines are unselected.

Furthermore, the control signal for the switch SL1SW in the selector circuit 501A changes from High to Low, so that the switch SL1SW turns ON. The other switches SL2SW to SLN/2SW in the selector circuit 501A remain OFF.

In addition, the control signal for the switch SLN/2+1SW in the selector circuit 501B changes from High to Low, so that the switch SLN/2+1SW turns ON. The other switches SLN/2+2SW to SLNSW in the selector circuit 501B remain OFF.

Still further, the control signal for the switch SW12 in the difference calculator circuit 503A and the control signal for the switch SW22 in the difference calculator circuit 503B change from High to Low, so that the switches SW12 and SW22 turn ON. The switches SW11 and SW21 remain OFF.

The second sample and hold circuit in the difference calculator circuit 503A receives a characteristic signal of the display OLED element E1 in a display pixel circuit 210 from the sensing line SL1 through the switches SL1SW and SW12. The second sample and hold circuit in the difference calculator circuit 503B receives a characteristic signal of the display OLED element E1 in a display pixel circuit 210 from the sensing line SLN/2+1 through the switches SL2+1SW and SW22.

At a subsequent time T14, the control signal for the switch SL1SW in the selector circuit 501A changes from Low to High, so that the switch SL1SW turns OFF. The control signal for the switch SLN/2+1SW in the selector circuit 501B also changes from Low to High, so that the switch SLN2+1SW turns OFF.

Further, the control signal for the switch SW12 in the difference calculator circuit 503A changes from Low to High, so that the switch SW12 turns OFF. The control signal for the switch SW22 in the difference calculator circuit 503B also changes from Low to High, so that the switch SW22 turns OFF. The other control signals do not change. Because of these switches turning OFF, the characteristic signals of the OLED elements E1 in the display pixel circuits 210 are held in the second sample and hold circuits in the difference calculator circuits 503A and 503B.

The difference calculator circuit 503A outputs data indicating the difference in characteristic signal between the dummy pixel circuit DC1 and the display pixel circuit 210 to the image control circuit 307 through the AD converter 505A. The difference calculator circuit 503B also outputs data indicating the difference in characteristic signal between the dummy pixel circuit DC2 and the display pixel circuit 210 to the image control circuit 307 through the AD converter 505B.

The signal on the sensing scanning line SS1 is kept Low until a time T15. During the period from the time T14 to the time T15, the selector circuit 501A selects the sensing lines SL2 to SLN/2 one by one. The difference calculator circuit 503A takes the characteristic signal of the OLED element of the display pixel circuit 210 from the selected sensing line into the second sample and hold circuit and outputs data indicating the difference of the received characteristic signal of the pixel circuit 210 from the reference characteristic signal of the dummy pixel circuit DC1 to the image control circuit 307.

In similar, the selector circuit 501B selects the sensing lines SLN/2+2 to SLN one by one. The difference calculator circuit 503B takes the characteristic signal of the OLED element of the display pixel circuit 210 from the selected sensing line into the second sample and hold circuit and outputs data indicating the difference of the received characteristic signal of the pixel circuit 210 from the reference characteristic signal of the dummy pixel circuit DC2 to the image control circuit 307.

Subsequently, the sensing scanning lines SS2 to SSM are selected one by one and the foregoing processing described about the sensing scanning line SS1 is performed repeatedly. As a result, the current-voltage characteristic of the OLED elements in all display pixel circuits 210 are measured in comparison to the current-voltage characteristic of the OLED element of the dummy pixel circuit DC1 or DC2.

In the timing chart of FIG. 9, the period where each switch is ON is approximately twice as long as the corresponding period in the timing chart of FIG. 5. In the example described with reference to FIG. 9, the period where each circuit is selected for measurement is approximately twice as long as the corresponding period in the example described with reference to FIG. 5.

The configuration example described with reference to FIGS. 8 and 9 uses two dummy pixel circuits and two circuit sets for deterioration evaluation. In another example, three or more dummy pixel circuits and three or more circuit sets for deterioration evaluation can be used. Each pixel circuit column can include a dummy pixel circuit to compare its current-voltage characteristic with the current-voltage characteristic of the display pixel circuits in the same pixel circuit column, like in the second embodiment. A pixel circuit column is a pixel circuit line. The plurality of dummy pixel circuits can be connected to sensing lines different from the sensing lines connected to display pixel circuits, as described with reference to FIG. 1.

The plurality of dummy pixel circuits can be included in different pixel circuit rows. For example, the first dummy pixel circuit can be connected to the sensing scanning line SS1 and the second dummy pixel circuit can be connected to the sensing scanning line SSM/2+1.

The current-voltage characteristic of the display pixel circuits connected to the sensing scanning lines SS1 to SSM/2 are measured in comparison to the current-voltage characteristic of the first dummy pixel circuit. The current-voltage characteristic of the display pixel circuits connected to the sensing scanning lines SSM/2+1 to SSM are measured in comparison to the current-voltage characteristic of the second dummy pixel circuit. The measurement in comparison to the characteristic of the first dummy pixel circuit and the measurement in comparison to the characteristic of the second dummy pixel circuit are conducted in parallel as described with reference to FIGS. 8 and 9.

Fourth Embodiment

Figure 10:
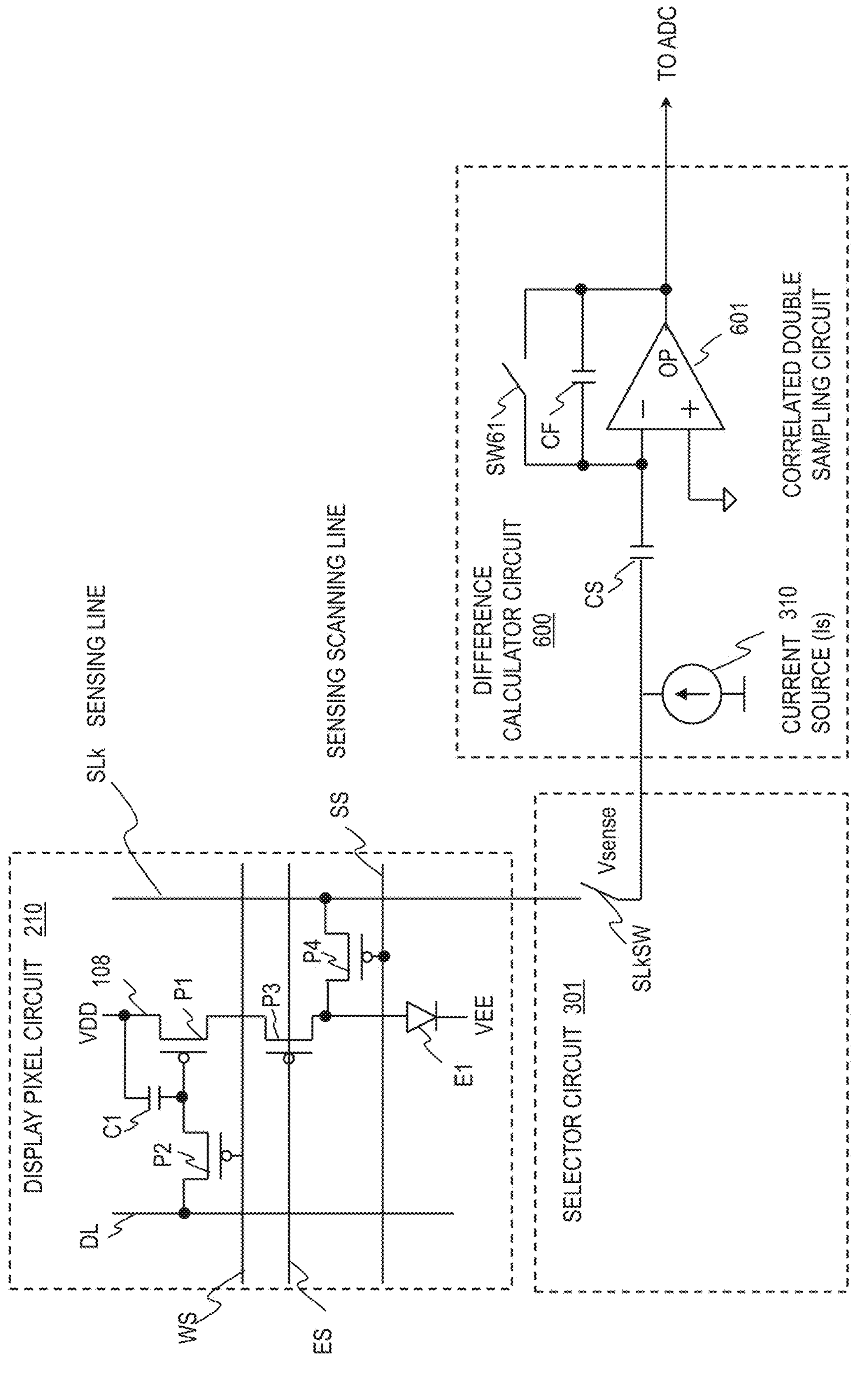
FIG. 10 illustrates another configuration example of a difference calculator circuit.

Hereinafter, other configuration examples of the difference calculator circuit are described. FIG. 10 illustrates another configuration example of the difference calculator circuit. The following mainly describes differences from the configuration example in FIG. 2. The difference calculator circuit 600 includes a correlated double sampling circuit to generate a signal proportional to the difference of the characteristic signal of a display pixel circuit from the reference characteristic signal of a dummy pixel circuit. The correlated double sampling circuit includes an operational amplifier 601, a capacitive element CS, another capacitive element CF, and a switch 61.

The capacitive element CS is connected between the inverting input of the operational amplifier 601 and the selector circuit 301. The switch (SW) 61 and the capacitive element CF are connected in parallel between the output of the operational amplifier 601 and a node between the inverting input of the operational amplifier 601 and the capacitive element CS. The current source 310 is connected to a node between the capacitive element CS and the selector circuit 301.

When the switch 61 is ON, a signal Vsense1 from a dummy pixel circuit is sampled and held. The switch 61 is subsequently turned OFF and a signal Vsense2 from a display pixel circuit is input. The output Vout of the operational amplifier 601 is (Cs/Cf*(Vsense1−Vsense2)).

Figure 11:
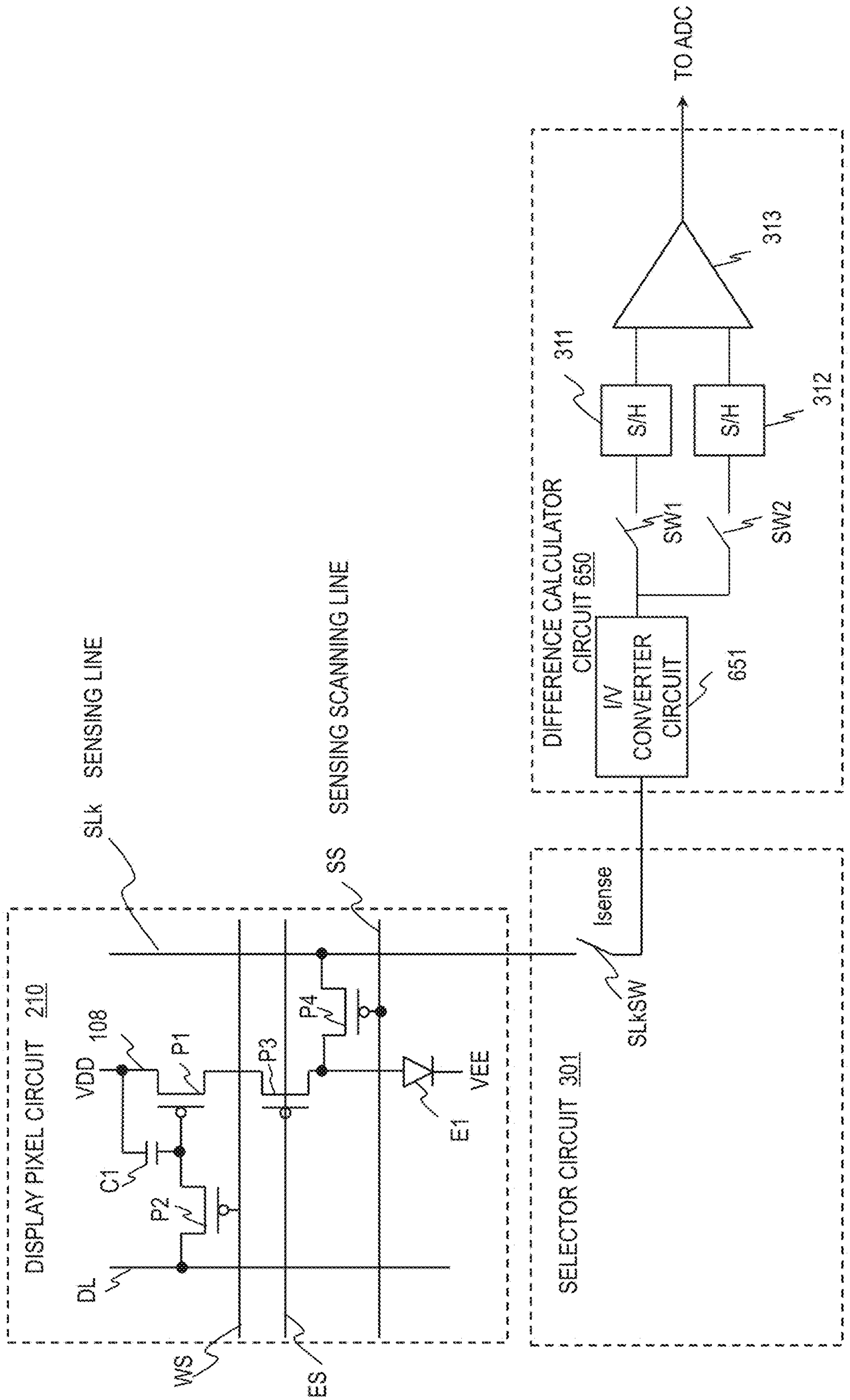
FIG. 11 illustrates still another configuration example of a difference calculator circuit.

FIG. 11 illustrates still another configuration example of the difference calculator circuit. The following mainly describes differences from the configuration example in FIG. 2. The difference calculator circuit 650 includes a current-voltage converter circuit (I/V converter circuit) 651 in place of the constant current source 310 in the difference calculator circuit 303 in FIG. 2. The current-voltage converter circuit 651 supplies a voltage to the OLED element E1 through the switch SLKSW and the selection transistor P4 and converts a current signal (Isense) flowing through the OLED element via the sensing line into a voltage signal.

The current-to-voltage converted signal from a dummy pixel circuit is held in the sample and hold circuit 311 and the current-to-voltage converted signal from a display pixel circuit is held in the sample and hold circuit 312. As described with reference to FIG. 2, the difference amplifier circuit 313 outputs the voltage difference Vout to the ADC. The difference calculator circuit 650 can be configured in such a manner that the correlated double sampling circuit illustrated in FIG. 10 is connected to the output of the current-voltage converter circuit 651.

Figure 12:
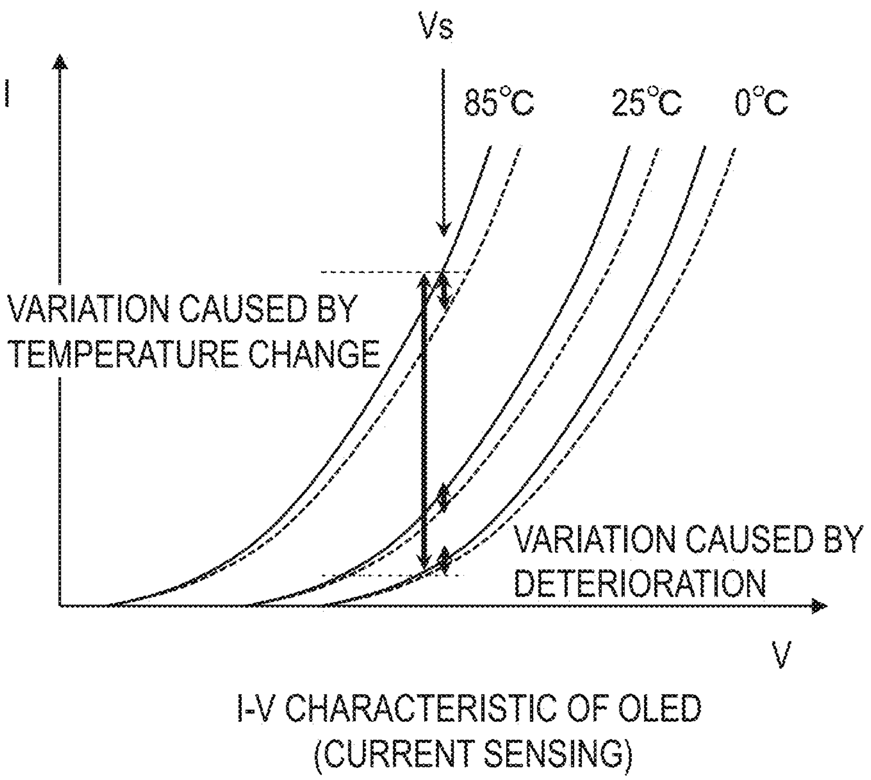
FIG. 12 schematically illustrates the variation in current-voltage characteristic of an OLED element caused by temperature change and the variation caused by deterioration.

The difference calculator circuit 650 measures the current of an OLED element under a constant voltage. FIG. 12 schematically illustrates the variation in current-voltage characteristic (I-V characteristic) of an OLED element caused by temperature change and the variation caused by deterioration. In the graph of FIG. 12, the horizontal axis represents the voltage of the OLED element and the vertical axis represents current. FIG. 12 schematically illustrates the variation in current of the OLED element caused by temperature change and the variation caused by deterioration under a constant voltage Vs.

Specifically, FIG. 12 illustrates variations in current-voltage characteristic caused by deterioration at the temperatures of 85° C., 25° C., and 0° C. As the temperature falls from 85° C. to 0° C., the current of the OLED element in response to the constant voltage Vs significantly increases. Compared to this variation, the variation in current caused by deterioration is small at any of the temperatures 85° C., 25° C. and 0° C.

The effect of temperature onto the measured current-voltage characteristic of an OLED element can be made small by referring to the difference between the current-voltage characteristic of the reference OLED element and the current-voltage characteristic of the OLED element to be evaluated. Accordingly, the resolution required for the AD converter 305 can be lowered.

Fifth Embodiment

This embodiment measures the I-V characteristic during a picture displaying period. As a result, measurement consistent to the actual status becomes available. The picture displaying period is a period where the pixel circuit rows in the display region 125 are displaying a picture in accordance with video data from the external. A picture displaying period consists of a plurality of consecutive frame periods. In an example, the frame periods for different pixel circuit rows have the same length. Since the pixel circuit rows are selected one by one to be provided with a data signal, the start times of the frame periods for different pixel circuit rows are shifted in the order of selection.

This embodiment includes a period for measuring the I-V characteristic (I-V sensing) in one frame period to measure the I-V characteristic of an OLED element. The example described in the following is based on an assumption that the OLED display device 10 have the configuration example illustrated in FIG. 6. Since the pixel circuits do not perform emission control in accordance with a data signal during the I-V sensing period, the I-V sensing period is a period where a frame image of a picture is not displayed.

The sensing scanning line driving circuit 132 selects the pixel circuit rows one by one and the sensing line driving circuit 133 selects the pixel circuits in the selected pixel circuit row one by one to measure the I-V characteristic. The measurement of the I-V characteristic is performed in a period different from the period of emission control in accordance with a data signal (frame image displaying period) within one frame period. The I-V characteristic of unselected pixel circuits is not measured.

Figure 13:
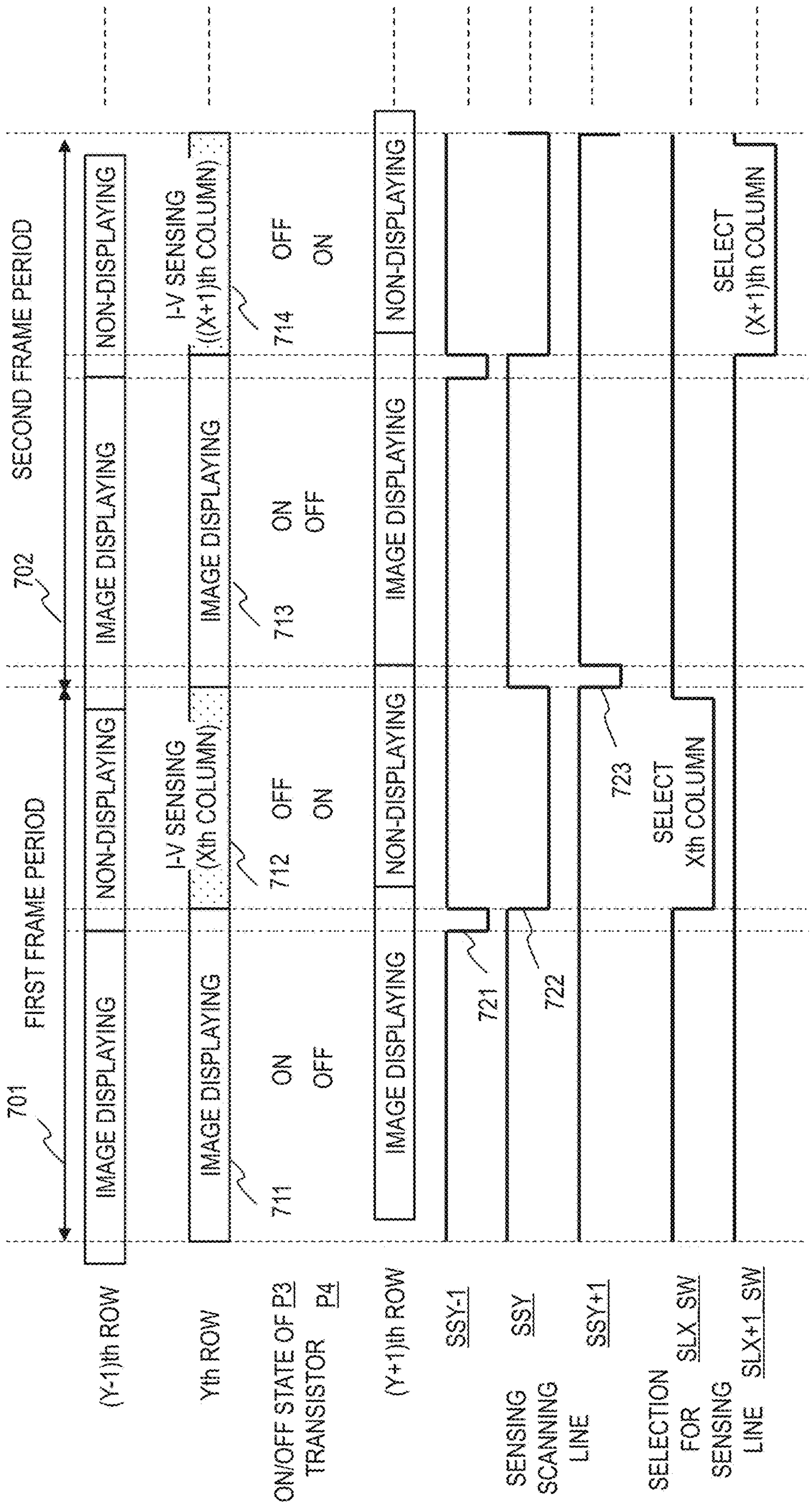
FIG. 13 is a timing chart schematically illustrating an example of evaluating the deterioration in brightness of a light-emitting element within a frame period.

FIG. 13 is a timing chart of the control signals in this embodiment. FIG. 13 illustrates two consecutive frame periods for the (Y−1)th, Y-th, and (Y+1)th pixel circuit rows. The first frame period and the second frame period for the Y-th pixel circuit row are provided with reference signs 701 and 702, respectively. The first frame period for the (Y−1)th pixel circuit row starts earlier than the first frame period 701 by a specific time and the first frame period for the (Y+1)th pixel circuit row starts later than the first frame period 701 by the aforementioned specific time. All frame periods have the same length.

FIG. 13 illustrates an example where the Y-th pixel circuit row is selected for I-V characteristic measurement. In the first frame period 701, the X-th display pixel circuit column is selected for I-V characteristic measurement and in the next second frame period 702, the (X+1)th display pixel circuit column is selected for I-V characteristic measurement. In the example of FIG. 13, only one pixel circuit is selected for I-V measurement within one frame period and other pixel circuits are selected one after another as the time advances from a frame period to the next.

The (Y−1)th pixel circuit row is selected immediately before the Y-th pixel circuit row and the (Y+1)th pixel circuit row is selected next to the Y-th pixel circuit row for I-V characteristic measurement. As described above, the pixel circuits in the selected pixel circuit row are successively selected for I-V characteristic measurement in consecutive different frame periods. For example, a dummy pixel circuit is selected first and thereafter, the display pixel circuits are selected one by one from the leftmost display pixel circuit to the rightmost display pixel circuit. In the example of FIG. 13, the I-V characteristic of the dummy pixel circuit in the Y-th pixel circuit row has been measured in the frame period earlier than the first frame period 701 by X frame periods.

The first frame period 701 consists of a frame image displaying period 711 and a following I-V sensing period 712 for the X-th pixel circuit column. The pixel circuit selected for I-V characteristic measurement operates to light the OLED element at the brightness according to the data signal in the frame image displaying period 711 and operates to measure the I-V characteristic in the I-V sensing period 712.

That is to say, the transistor P3 is ON and the transistor P4 is OFF during the frame image displaying period 711 whereas the transistor P3 is OFF and the transistor P4 is ON during the I-V sensing period 712.

As illustrated in FIG. 2, the display scanning line driving circuit 131 successively selects pixel circuit rows with scanning lines ES. The transistors P3 in the selected pixel circuit row are ON and the transistors P3 in the unselected pixel circuit row are OFF. In this example, the scanning signals transmitted by the scanning lines ES for all pixel circuit rows have the same pulse width. Accordingly, the pixel circuit rows and pixel circuits not selected for I-V characteristic measurement are provided with a frame image non-displaying period having the same length as the I-V sensing period 712. Only the I-V characteristic of the selected pixel circuit is measured in a frame image non-displaying period.

Whether a transistor P4 is to be ON or OFF is controlled by the selection signal transmitted by a sensing scanning line. In the example illustrated in FIG. 13, the width of the selection pulse 722 (the Low-state period of the signal) on the sensing scanning line SSY is longer than the width of the selection pulse 721 on the sensing scanning line SSY−1 and the selection pulse 723 on the sensing scanning line SSY+1.

The sensing scanning line driving circuit 132 successively outputs pulses 721, 722, and 723 to the sensing scanning lines SSY−1, SSY, and SSY+1, respectively. The sensing scanning line driving circuit 132 can adjust the width of the selection pulses to be output to the individual sensing scanning lines by controlling the clock signal for shifting the pulses.

The selection pulse 721 to the sensing scanning line SSY−1 is output in the first half of the image non-displaying period of the (Y−1)th pixel circuit row and the selection pulse 723 to the sensing scanning line SSY+1 is output in the latter half of the image non-displaying period of the (Y+1)th pixel circuit row. The selection pulses to the sensing scanning lines upper than (previous to) the sensing scanning line SSY is output in the same timing as the selection pulse 721 to the sensing scanning line SSY−1. The selection pulses to the sensing scanning lines lower than (subsequent to) the sensing scanning line SSY are output in the same timing as the selection pulse 723 to the sensing scanning line SSY+1. All the selection pulses except for the selection pulse 722 can have the same width.

As understood from the above description, the selection pulse to the Y-th pixel circuit row can have a long width for appropriate IV characteristic measurement by changing the output timing of selection pulses before and after the Y-th pixel circuit row. The sensing scanning line driving circuit 132 changes the output timing of selection pulses in the period after sensing scanning of the M-th pixel circuit row but before sensing scanning of the first pixel circuit row.

The example described with FIG. 13 selects only one pixel circuit from the selected circuit row within one frame period to measure its I-V characteristic. Unlike this configuration, the sensing line driving circuit 133 can select a plurality of pixel circuits successively to measure their I-V characteristic. Then, the time to measure the I-V characteristic can be reduced.

The example described with FIG. 13 successively measures the I-V characteristic of the display pixel circuits after measuring the I-V characteristic of a dummy pixel circuit. Unlike this configuration, the sensing line driving circuit 133 can measure the I-V characteristic of a dummy pixel circuit for a plurality of times during the I-V characteristic measurement on one pixel circuit row. Every time I-V characteristic measurement on a predetermined number of display pixel circuits is completed, I-V characteristic measurement on the dummy pixel circuit is conducted. The predetermined number can be one or a number greater than one. This configuration reduces the time lag between measurement on the dummy pixel circuit and measurement on a display pixel circuit.

The example illustrated in FIG. 13 turns ON the transistor P4 to measure the I-V characteristic within a frame period. Accordingly, the current flows to the OLED element to light the OLED element. For this reason, the light emission during the I-V characteristic measurement could be conspicuous, particularly in displaying an image at low emission intensities. To reduce the effect of the I-V characteristic measurement onto the displayed image, whether to conduct I-V characteristic measurement can be determined depending on the frame image to be displayed.

The description provided with reference to FIG. 13 is applicable to a circuit configuration different from the one in FIG. 6, such as the circuit configuration of FIG. 1 or 8, with modification as necessary.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device comprising:

a display pixel circuit including a display light-emitting element, a first driving transistor to control current to the display light-emitting element, and a first switching transistor connected to a node between the first driving transistor and an anode of the display light-emitting element;

a dummy pixel circuit including a reference light-emitting element, a second driving transistor to control current to the reference light-emitting element, and a second switching transistor connected to a node between the second driving transistor and an anode of the reference light-emitting element; and a display driving circuit including a correlated double sampling circuit and a current source, wherein the display pixel circuit is configured to control light emission of the display light-emitting element based on a data signal in accordance with video data, wherein the reference light-emitting element is precluded from the control in accordance with video data, wherein the display driving circuit is configured to:

turn on the second switch transistor to provide current from the current source to the reference light-emitting element without passing through the second driving transistor and acquire a reference signal indicating a current-voltage characteristic of the reference light-emitting element;

turn on the first switch transistor to provide current from the current source to the display light-emitting element without passing through the first driving transistor and acquire a characteristic signal indicating the current-voltage characteristic of the display light-emitting element; and generate a signal indicating a degree of deterioration of the display light-emitting element based on a difference of the characteristic signal from the reference signal with the correlated double sampling circuit.

2. The display device according to claim 1, wherein the reference light-emitting element is included in a dummy pixel circuit, and wherein the dummy pixel circuit has a circuit configuration identical to a circuit configuration of the display pixel circuit.

3. The display device according to claim 1, wherein the display driving circuit is configured to:

display a picture in accordance with the video data;

select all display pixel circuits including display light-emitting elements that emit light of the same color as light emitted from the reference light-emitting element one by one; and successively generate signals indicating degrees of deterioration of the display light-emitting elements in the display pixel circuits selected one by one based on differences of characteristic signals of the display pixel circuits from the reference signal with the correlated double sampling circuit.

4. The display device according to claim 1, comprising a plurality of pixel circuit lines, wherein each of the plurality of pixel circuit lines includes a dummy pixel circuit and a plurality of display pixel circuits connected to a common control line, wherein the dummy pixel circuit includes a reference light-emitting element, wherein each of the plurality of display pixel circuits includes a display light-emitting element, and wherein the display driving circuit is configured to, with respect to each of the plurality of pixel circuit lines, generate signals indicating degrees of deterioration of the display light-emitting elements based on differences of characteristic signals of the display light-emitting elements from a reference signal of the reference light-emitting element with the correlated double sampling circuit.

5. The display device according to claim 4, further comprising:

a plurality of sensing lines configured to transmit a signal indicating the current-voltage characteristic of a light-emitting element; and a plurality of sensing scanning lines configured to transmit a selection signal to select a pixel circuit from which to measure the current-voltage characteristic of the light-emitting element therein, wherein each of the plurality of sensing lines is connected to one pixel circuit column, wherein each of the plurality of sensing scanning lines is connected to one pixel circuit row, and wherein each of the plurality of pixel circuit lines is a pixel circuit row connected to one sensing scanning line.

6. The display device according to claim 1, further comprising:

a plurality of pixel circuit lines; and a first dummy pixel circuit and a second dummy pixel circuit each including a reference light-emitting element, wherein each of the plurality of pixel circuit lines includes a plurality of display pixel circuits connected to a common control line, wherein the display driving circuit is configured to:

perform first processing to generate signals indicating degrees of deterioration of display light-emitting elements in a first group of pixel circuit lines based on differences of characteristic signals of the display light-emitting elements in the first group of pixel circuit lines from a reference signal of the reference light-emitting element in the first dummy pixel circuit with the correlated double sampling circuit; and perform second processing to generate signals indicating degrees of deterioration of display light-emitting elements in a second group of pixel circuit lines based on differences of characteristic signals of the display light-emitting elements in the second group of pixel circuit lines from a reference signal of the reference light-emitting element in the second dummy pixel circuit with the correlated double sampling circuit, and wherein the first processing and the second processing are performed in parallel.

7. The display device according to claim 6, wherein the first dummy pixel circuit is connected to a control line for a first display pixel circuit line, and wherein the second dummy pixel circuit is connected to a control line for a second display pixel circuit line.

8. The display device according to claim 6, further comprising:

a plurality of sensing lines configured to transmit a signal indicating the current-voltage characteristic of a light-emitting element; and a plurality of sensing scanning lines configured to transmit a selection signal to select a pixel circuit from which to measure the current-voltage characteristic of the light-emitting element therein, wherein each of the plurality of sensing lines is connected to one pixel circuit column, wherein each of the plurality of sensing scanning lines is connected to one pixel circuit row, and wherein each of the plurality of pixel circuit lines is a pixel circuit column connected to one sensing line.

9. The display device according to claim 1, comprising:

a plurality of display pixel circuits; and a plurality of reference light-emitting elements, wherein the display light-emitting elements in the plurality of display pixel circuits are composed of display light-emitting elements for different colors of light, wherein the plurality of reference light-emitting elements are composed of reference light-emitting elements for the different colors of light, and wherein the display driving circuit is configured to generate signals indicating degrees of deterioration of the display light-emitting elements based on differences of characteristic signals of display light-emitting elements for each color of light from a reference signal of a reference light-emitting element for the same color of light as the display light-emitting elements with the correlated double sampling circuit.

10. The display device according to claim 1, wherein the display driving circuit is configured to:

display a frame image in accordance with the video data in a first period within one frame period; and acquire a reference signal indicating the current-voltage characteristic of the reference light-emitting element or a characteristic signal indicating the current-voltage characteristic of the display light-emitting element in a second period different from the first period within the one frame period.

11. The display device according to claim 10, wherein the display driving circuit is configured to:

acquire characteristic signals indicating the current-voltage characteristic of display light-emitting elements of a plurality of display pixel circuits within the one frame period.

12. The display device according to claim 10, wherein the display driving circuit is configured to:

acquire a reference signal indicating the current-voltage characteristic of the reference light-emitting element at intervals of a predetermined number of frame periods; and acquire characteristic signals indicating the current-voltage characteristic of display light-emitting elements of a plurality of display pixel circuits within the predetermined number of frame periods.

* * * * *